US008560213B2

(12) United States Patent  (10) Patent No.: US 8,560,213 B2
Onishi et al.  (45) Date of Patent: Oct. 15, 2013

(54) EXHAUST GAS RECIRCULATION DEVICE OF ENGINE

(75) Inventors: Tomomi Onishi, Susono (JP); Tomihisa Oda, Numazu (JP); Bungo Kawaguchi, Susono (JP); Masaaki Satou, Susono (JP); Satoshi Kobayakawa, Susono (JP); Takeru Shirasawa, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 236 days.

(21) Appl. No.: 12/675,656

(22) PCT Filed: Sep. 3, 2009

(86) PCT No.: PCT/JP2009/065779
§ 371 (c)(1),
(2), (4) Date: Mar. 17, 2011

(87) PCT Pub. No.: WO2011/027477
PCT Pub. Date: Mar. 10, 2011

(65) Prior Publication Data
US 2011/0155109 A1  Jun. 30, 2011

(51) Int. Cl.
*B60T 7/12* (2006.01)
*G05D 1/00* (2006.01)
*G06F 7/00* (2006.01)
*G06F 17/00* (2006.01)
*F02M 25/07* (2006.01)

(52) U.S. Cl.
USPC .................................... 701/108; 123/568.11

(58) Field of Classification Search
USPC ................. 123/704, 406.44, 568.11, 568.12, 123/568.21, 698; 60/603, 605.2, 273, 278; 701/108
See application file for complete search history.

(56) References Cited

U.S. PATENT DOCUMENTS 3,832,668 A * 8/1974 Berman .................... 338/22 SD
4,164,867 A * 8/1979 Hickling et al. .............. 374/117
(Continued)

FOREIGN PATENT DOCUMENTS

JP  2005-139984 A  6/2005
JP  2005-535823 A  11/2005
(Continued)

OTHER PUBLICATIONS

Japanese Office Action issued Sep. 13, 2011 for counterpart Japanese Application No. 2010-506748.

*Primary Examiner* — Willis R Wolfe, Jr.
*Assistant Examiner* — Anthony L Bacon
(74) *Attorney, Agent, or Firm* — Sughrue Mion, PLLC

(57) ABSTRACT

An exhaust gas recirculation device of an engine (10) of the invention comprises a first exhaust gas recirculation passage (50) for connecting an exhaust passage (40) and an intake passage (30) to each other and introducing into the intake passage an exhaust gas discharged from a combustion chamber (21) to the exhaust passage, and a second exhaust gas recirculation passage (55) for connecting the exhaust passage upstream of a part of the exhaust passage connected to the first exhaust gas recirculation passage and the intake passage downstream of a part of the intake passage connected to the first exhaust gas recirculation passage to each other and introducing into the intake passage the exhaust gas discharged from the combustion chamber to the exhaust passage. The amount of the exhaust gas introduced into the intake passage via the first exhaust gas recirculation passage is controlled to a first target exhaust gas recirculation amount and the amount of the exhaust gas introduced into the intake passage via the second exhaust gas recirculation passage is controlled to a second target exhaust gas recirculation amount. The amount of exhaust gas introduced into the first and second exhaust gas passages is controlled in accordance with an allowable upper flame temperature.

11 Claims, 9 Drawing Sheets

(56) References Cited

U.S. PATENT DOCUMENTS

| | | | |
|---|---|---|---|
| 4,305,287 A * | 12/1981 | Bohm et al. | 431/62 |
| 6,273,056 B1 * | 8/2001 | Shirakawa et al. | 123/305 |
| 6,651,432 B1 * | 11/2003 | Gray, Jr. | 60/605.2 |
| 7,043,914 B2 * | 5/2006 | Ishikawa | 60/605.2 |
| 7,197,867 B2 * | 4/2007 | Huang et al. | 60/295 |
| 7,836,693 B2 * | 11/2010 | Fujita et al. | 60/605.2 |
| 7,895,838 B2 * | 3/2011 | Ono | 60/605.2 |
| 2004/0050375 A1 * | 3/2004 | Arnold | 123/568.12 |
| 2005/0103014 A1 * | 5/2005 | Sasaki | 60/605.2 |
| 2009/0132153 A1 | 5/2009 | Shutty et al. | |
| 2009/0223221 A1 * | 9/2009 | Onishi et al. | 60/603 |
| 2010/0000500 A1 * | 1/2010 | Shimizu et al. | 123/568.21 |
| 2010/0050999 A1 * | 3/2010 | Murata et al. | 123/568.11 |
| 2011/0054762 A1 * | 3/2011 | Nakayama et al. | 701/108 |

FOREIGN PATENT DOCUMENTS

| | | |
|---|---|---|
| JP | 2008-064046 A | 3/2008 |
| JP | 2008-088848 A | 4/2008 |
| JP | 2008-208720 A | 9/2008 |
| WO | 2004/015255 A1 | 2/2004 |
| WO | 2008/038083 A2 | 4/2008 |

* cited by examiner

EXHAUST GAS RECIRCULATION DEVICE OF ENGINE

TECHNICAL FIELD

The present invention relates to an exhaust gas recirculation device of an engine.

BACKGROUND ART

An exhaust gas recirculation device for recirculating an exhaust gas into combustion chambers by introducing into an intake passage of an engine, an exhaust gas discharged from the combustion chambers of the engine to an exhaust passage, is disclosed in the specification of US Patent Publication No. 2009/013253. Much inert gas such as carbon dioxide is included in the exhaust gas, and therefore a temperature of combustion of fuel in the combustion chamber is decreased by recirculating the exhaust gas into the combustion chamber. Accordingly, the production of nitrogen oxide along with the combustion of the fuel in the combustion chamber is restricted.

The specification of the above-mentioned US patent Publication discloses the exhaust gas recirculation device comprising an exhaust gas recirculation passage (hereinafter, this passage is referred to as "upstream exhaust gas recirculation passage") for introducing the exhaust gas from the exhaust passage upstream of a turbine of a turbocharger into the intake passage downstream of a compressor of the turbocharger, and an exhaust gas recirculation passage (hereinafter, this passage is referred to as "downstream exhaust gas recirculation passage") for introducing the exhaust gas from the exhaust passage downstream of the turbine of the turbocharger into the intake passage upstream of the compressor of the turbocharger.

The specification of the above-mentioned US patent Publication does not clearly disclose a difference in the property between the exhaust gas introduced into the intake passage via the upstream exhaust gas recirculation passage and the exhaust gas introduced into the intake passage via the downstream exhaust gas recirculation passage, however, generally, a pressure and a temperature of the exhaust gas introduced into the intake passage via the upstream exhaust gas recirculation passage are relatively high, while a pressure and a temperature of the exhaust gas introduced into the intake passage via the downstream exhaust gas recirculation passage are relatively low.

In the exhaust gas recirculation device disclosed in the specification of the above-mentioned US patent Publication, in consideration of matters such as an improvement of fuel consumption and a decrease of exhaust emission, on the assumption that the property of the exhaust gas introduced into the intake passage via the upstream exhaust gas recirculation passage is different from that of the exhaust gas introduced into the intake passage via the downstream exhaust gas recirculation passage, the ratio of the amounts of the exhaust gases introduced into the intake passage via the upstream and downstream exhaust gas recirculation passages are controlled.

As explained above, when the temperature of the combustion of the fuel in the combustion chamber becomes low, the production of the nitrogen oxide along with the combustion of the fuel in the combustion chamber is restricted. An exhaust gas recirculation device of an engine is known wherein a temperature in the combustion chamber (hereinafter, this temperature is referred to as "cylinder temperature") for restricting the amount of the produced nitrogen oxide to an allowable amount is set as a reference cylinder temperature, and the ratio of the amounts of the exhaust gases introduced into the intake passage via the upstream and downstream exhaust gas recirculation passages is controlled such that the cylinder temperature becomes lower than the reference cylinder temperature.

As explained above, the cylinder temperature used for controlling the cylinder temperature to a temperature lower than the reference cylinder temperature in order to restrict the production of the nitrogen oxide along with the combustion of the fuel in the combustion chamber, is a temperature obtained by averaging temperatures in regions of the combustion chamber on the combustion of the fuel. Accordingly, when the temperature in a part of the regions of the combustion chamber on the combustion of the fuel is extremely high and the temperature in the remaining regions is relatively low, it is realized that the cylinder temperature is relatively low. Therefore, even when the cylinder temperature is controlled to a temperature lower than the above-mentioned reference cylinder temperature, the temperatures in a part of the regions of the combustion chamber may be extremely high. By the study of the inventors of this application, it is realized that compared with the cylinder temperature, the temperature in the local region in the combustion chamber largely relates to the production of the nitrogen oxide along with the combustion of the fuel in the combustion chamber. That is, it is realized that even when the cylinder temperature is controlled to a temperature lower than the reference cylinder temperature, the amount of the produced nitrogen oxide along with the combustion of the fuel in the combustion chamber can not be restricted to an allowable amount, when the temperature in a part of the regions of the combustion chamber is extremely high.

DISCLOSURE OF THE INVENTION

In consideration of the above-explained circumstances, the object of the invention is to surely restrict the amount of the produced nitrogen oxide along with the combustion of the fuel in the combustion chamber to an allowable amount.

In order to accomplish the object, an exhaust gas recirculation device of an engine of the first invention of this application comprises a first exhaust gas recirculation passage for connecting an exhaust passage and an intake passage to each other and introducing into the intake passage an exhaust gas discharged from a combustion chamber to the exhaust passage, and a second exhaust gas recirculation passage for connecting the exhaust passage upstream of a part of the exhaust gas connected to the first exhaust gas recirculation passage and the intake passage downstream of a part of the intake passage connected to the first exhaust gas recirculation passage and introducing into the intake passage the exhaust gas discharged from the combustion chamber to the exhaust passage. Further, according to this invention, an amount of the exhaust gas introduced into the intake passage via the first exhaust gas recirculation passage is controlled to a first target exhaust gas recirculation amount, and an amount of the exhaust gas introduced into the intake passage via the second exhaust gas recirculation passage is controlled to a second target exhaust gas recirculation amount. Further, according to this invention, when a temperature of the flame on the combustion of the fuel in the combustion chamber is lower than or equal to a predetermined allowable upper limit flame temperature, a first reference exhaust gas recirculation amount set depending on an operation condition of the engine, is set as the first target exhaust gas recirculation amount, and a second reference exhaust gas recirculation amount set depending on the operation condition of the engine, is set as the second target exhaust gas recirculation amount. That is, when the temperature of the flame is lower than or equal to the allowable upper limit flame temperature, it is judged that it is unnecessary to quickly decrease the temperature of the flame, and therefore the reference exhaust gas recirculation amounts are employed as the target exhaust gas recirculation amounts. On the other hand, when the temperature of the flame on the combustion of the fuel in the combustion chamber is higher than the allowable upper limit flame temperature, one of the first reference exhaust gas recirculation amount and an amount smaller than the first reference exhaust gas recirculation amount is set as the first target exhaust gas recirculation amount and an amount larger than the second reference exhaust gas recirculation amount is set as the second target exhaust gas recirculation amount. That is, when the temperature of the flame is higher than the allowable upper limit flame temperature, it is judged that it is necessary to quickly decrease the temperature of the flame, and therefore an amount larger than the second exhaust gas recirculation amount which is finally to be a target amount when the temperature of the flame is lower than or equal to the allowable upper limit flame temperature, is set as the second target exhaust gas recirculation amount.

According to this invention, when the temperature of the flame becomes higher than the allowable upper limit flame temperature, the amount of the exhaust gas introduced into the intake passage via the second exhaust gas recirculation passage becomes large. Accordingly, the concentration of the oxygen in the gas introduced into the combustion chamber relatively decreases. In this regard, compared with the exhaust gas introduced into the intake passage via the first exhaust gas recirculation passage, the exhaust gas introduced into the intake passage via the second exhaust gas recirculation passage early reaches the combustion chamber. Accordingly, compared with the case that the amount of the exhaust gas introduced via the first exhaust gas recirculation passage is increased, an effect of the increase of the amount of the exhaust gas introduced via the second exhaust gas recirculation passage early influences the combustion chamber and the concentration of the oxygen in the gas introduced into the combustion chamber quickly decreases in the case that the amount of the exhaust gas introduced via the second exhaust gas recirculation passage is increased. In this regard, the concentration of the oxygen in the gas introduced into the combustion chamber largely relates to the temperature of the flame. Accordingly, in order to decrease the temperature of the flame, the decrease of the concentration of the oxygen in the gas introduced into the combustion chamber is effective and it is preferred that the concentration of the oxygen can be quickly decreased.

Under the circumstances, according to the invention, when the concentration of the oxygen in the gas introduced into the combustion chamber should be decreased, the amount of the exhaust gas introduced into the intake passage via the second exhaust gas recirculation passage, which exhaust gas early influences the concentration of the oxygen, is increased. Therefore, according to this invention, when the temperature of the flame is higher than the allowable upper limit flame temperature, the temperature of the flame is quickly decreased.

Further, according to the exhaust gas recirculation device of the engine of the second invention of this application, in the first invention, when the temperature of the flame on the combustion of the fuel in the combustion chamber is higher than the allowable upper limit flame temperature, an amount which can make the concentration of the oxygen in a gas introduced into the combustion chamber an oxygen concentration which can decrease the temperature of the flame, is set as the second target exhaust gas recirculation amount. That is, according to this invention, in the first invention, in the case that an amount larger than the second reference exhaust gas recirculation amount is set as the target exhaust gas recirculation amount when the temperature of the flame is higher than the allowable upper limit flame temperature, an amount which can make the concentration of the oxygen in the gas introduced into the combustion chamber an oxygen concentration which can decrease the temperature of the flame, is set as the second target exhaust gas recirculation amount.

According to this invention, the second target exhaust gas recirculation amount is set in consideration of the concentration of the oxygen in the gas introduced into the combustion chamber, which concentration largely relates to the temperature of the flame. Therefore, according to this invention, when the temperature of the flame is higher than the allowable upper limit flame temperature, the temperature of the flame is surely decreased.

Further, according to the exhaust gas recirculation device of the engine of the third invention of this application, in any of the first and second inventions, when the temperature of the flame on the combustion of the fuel in the combustion chamber is higher than the allowable upper limit flame temperature, a large amount as the difference between the temperature of the flame on the combustion of the fuel in the combustion chamber and the allowable upper limit flame temperature becomes large, is set as the second target exhaust gas recirculation amount. That is, according to this invention, in any of the first and second inventions, in the case that an amount larger than the second reference exhaust gas recirculation amount is set as the second target exhaust gas recirculation amount when the temperature of the flame on the combustion of the fuel in the combustion chamber is higher than the allowable upper limit flame temperature, a large amount as the difference between the temperature of the flame and the allowable upper limit flame temperature becomes large, is set as the second target exhaust gas recirculation amount. That is, when the difference between the temperature of the flame and the allowable upper limit flame temperature is large, it is necessary to largely decrease the concentration of the oxygen in the gas introduced into the combustion chamber. In this regard, according to this invention, when the difference between the temperature of the flame and the allowable upper limit flame temperature is large, the concentration of the oxygen in the gas introduced into the combustion chamber is largely decreased as the difference becomes large. Accordingly, when the temperature of the flame is higher than the allowable upper limit flame temperature, the temperature of the flame is quickly decreased.

Further, according to the exhaust gas recirculation device of the engine of the fourth invention of this application, in any of the first to third inventions, when the temperature of the flame on the combustion of the fuel in the combustion chamber is higher than the allowable upper limit flame temperature, the first target exhaust gas recirculation amount is set to zero. According to this invention, compared with the case that the first target exhaust gas recirculation amount is not set to zero, the second target exhaust gas recirculation amount can be set to a large amount. That is, in the case that the concentration of the oxygen in the gas introduced into the combustion chamber should be decreased when the temperature of the flame is higher than the allowable upper limit flame temperature, if the second target exhaust gas recirculation amount can be set to a large amount as possible, the temperature of the flame can be quickly decreased as possible. On the other hand, when the amount of the exhaust gas in the gas introduced into the combustion chamber excessively increases, resulting from the setting of the second target exhaust gas recirculation amount to a large amount, the combustion of the fuel in the combustion chamber may be affected. However, according to this invention, since the first target exhaust gas recirculation amount is set to zero, the degree of the freedom of the setting of the second target exhaust gas recirculation amount to a large amount, becomes large, without affecting the combustion of the fuel in the combustion chamber.

Further, an exhaust gas recirculation device of an engine of the fifth invention of this application comprises a first exhaust gas recirculation passage for connecting an exhaust passage and an intake passage to each other and introducing into the intake passage an exhaust gas discharged from an combustion chamber to the exhaust passage, and a second exhaust gas recirculation passage for connecting the exhaust passage upstream of a part of the exhaust passage connected to the first exhaust gas recirculation passage and the intake passage downstream of a part of the intake passage connected to the first exhaust gas recirculation passage to each other and introducing into the intake passage the exhaust gas discharged from the combustion chamber to the exhaust passage. Further, according to this invention, the ratio between the amount of the exhaust gas introduced into the intake passage via the first exhaust gas recirculation passage and the amount of the exhaust gas introduced into the intake passage via the second exhaust gas recirculation passage, is controlled to a predetermined target exhaust gas recirculation ratio. Further, according to this invention, when a temperature of the flame on the combustion of a fuel in the combustion chamber is lower than or equal to a predetermined allowable upper limit flame temperature, a reference exhaust gas recirculation ratio set depending on an operation condition of the engine, is set as the target exhaust gas recirculation ratio. That is, when the temperature of the flame is lower than or equal to the allowable upper limit flame temperature, it is judged that it is unnecessary to quickly decrease the temperature of the flame, and therefore a reference exhaust gas recirculation ratio is set as the target exhaust gas recirculation ratio. On the other hand, when the temperature of the flame on the combustion of the fuel in the combustion chamber is higher than the allowable upper limit flame temperature, the reference exhaust gas recirculation ratio corrected such that the amount of the exhaust gas introduced into the intake passage via the second exhaust gas recirculation passage becomes larger than an amount which can accomplish the reference exhaust gas recirculation ratio, is set as the target exhaust gas recirculation ratio. That is, when the temperature of the flame is higher than the allowable upper limit flame temperature, it is judged that it is necessary to quickly decrease the temperature of the flame, and therefore the reference exhaust gas recirculation ratio corrected such that the amount of the exhaust gas introduced into the intake passage via the second exhaust gas recirculation passage becomes larger than an amount which can accomplish an exhaust gas recirculation ratio which is finally to be a target ratio when the temperature of the flame is lower than or equal to the allowable upper limit flame temperature, is set as the target exhaust gas recirculation ratio.

According to this invention, when the temperature of the flame becomes higher than the allowable upper limit flame temperature, the amount of the exhaust gas introduced into the intake passage via the second exhaust gas recirculation passage is increased. Therefore, according to this invention, because of the same reason as that explained in relation with the first invention, when the temperature of the flame is higher than the allowable upper limit flame temperature, the temperature of the flame is quickly decreased.

Further, according to the exhaust gas circulation device of the sixth invention of this application, in the fifth invention, when the temperature of the flame on the combustion of the fuel in the combustion chamber is higher than the allowable upper limit flame temperature, the reference exhaust gas recirculation ratio corrected such that the amount of the exhaust gas introduced into the intake passage via the second exhaust gas recirculation passage becomes large as the difference between the temperature of the flame on the combustion of the fuel in the combustion chamber and the allowable upper limit flame temperature becomes large, is set as the target exhaust gas recirculation ratio. That is, according to this invention, in the fifth invention, in the case that the reference exhaust gas recirculation ratio corrected when the temperature of the flame is higher than the allowable upper limit flame temperature, is set as the target exhaust gas recirculation ratio, the reference exhaust gas recirculation ratio corrected such that the amount of the exhaust gas introduced into the intake passage via the second exhaust gas recirculation passage becomes large as the difference between the temperature of the flame and the allowable upper limit flame temperature becomes large, is set as the target exhaust gas recirculation ratio. That is, when the difference between the temperature of the flame and the allowable upper limit flame temperature is large, it is necessary to largely decrease the concentration of the oxygen in the gas introduced into the combustion chamber. In this regard, according to this invention, when the difference between the temperature of the flame and the allowable upper limit flame temperature is large, the concentration of the oxygen in the gas introduced into the combustion chamber is largely decreased as the difference becomes large. Accordingly, when the temperature of the flame is higher than the allowable upper limit flame temperature, the temperature of the flame is quickly decreased.

Further, according to the exhaust gas recirculation device of the engine of the seventh invention of this application, in any of the fifth and sixth inventions, when the temperature of the flame on the combustion of the fuel in the combustion chamber is higher than the allowable upper limit flame temperature, the reference exhaust gas recirculation ratio corrected such that the amount of the exhaust gas introduced into the intake passage via the first exhaust gas recirculation passage becomes zero, is set as the target exhaust gas recirculation ratio. According to this invention, compared with the case that the amount of the exhaust gas introduced into the intake passage via the first exhaust gas recirculation passage is not set to zero, the reference exhaust gas recirculation ratio can be corrected such that the amount of the exhaust gas introduced into the intake passage via the second exhaust gas recirculation passage becomes large. That is, in the case that the concentration of the oxygen in the gas introduced into the combustion chamber should be decreased when the temperature of the flame is higher than the allowable upper limit flame temperature, if the amount of the exhaust gas introduced into the intake passage via the second exhaust gas recirculation passage can be increased as possible, the temperature of the flame can be quickly decreased as possible. On the other hand, when the amount of the exhaust gas in the gas introduced into the combustion chamber excessively increases, resulting from the increase of the amount of the exhaust gas introduced into the intake passage via the second exhaust gas recirculation passage, the combustion of the fuel in the combustion chamber may be affected. However, according to this invention, since the amount of the exhaust gas introduced into the intake passage via the first exhaust gas recirculation passage is set to zero, the degree of the freedom of the correction of the reference exhaust gas recirculation ratio such that the amount of the exhaust gas introduced into the intake passage via the second exhaust gas recirculation passage is large, becomes large, without affecting the combustion of the fuel in the combustion chamber.

BRIEF DESCRIPTION OF THE INVENTION

BEST MODE FOR CARRYING OUT THE INVENTION

Figure 1:
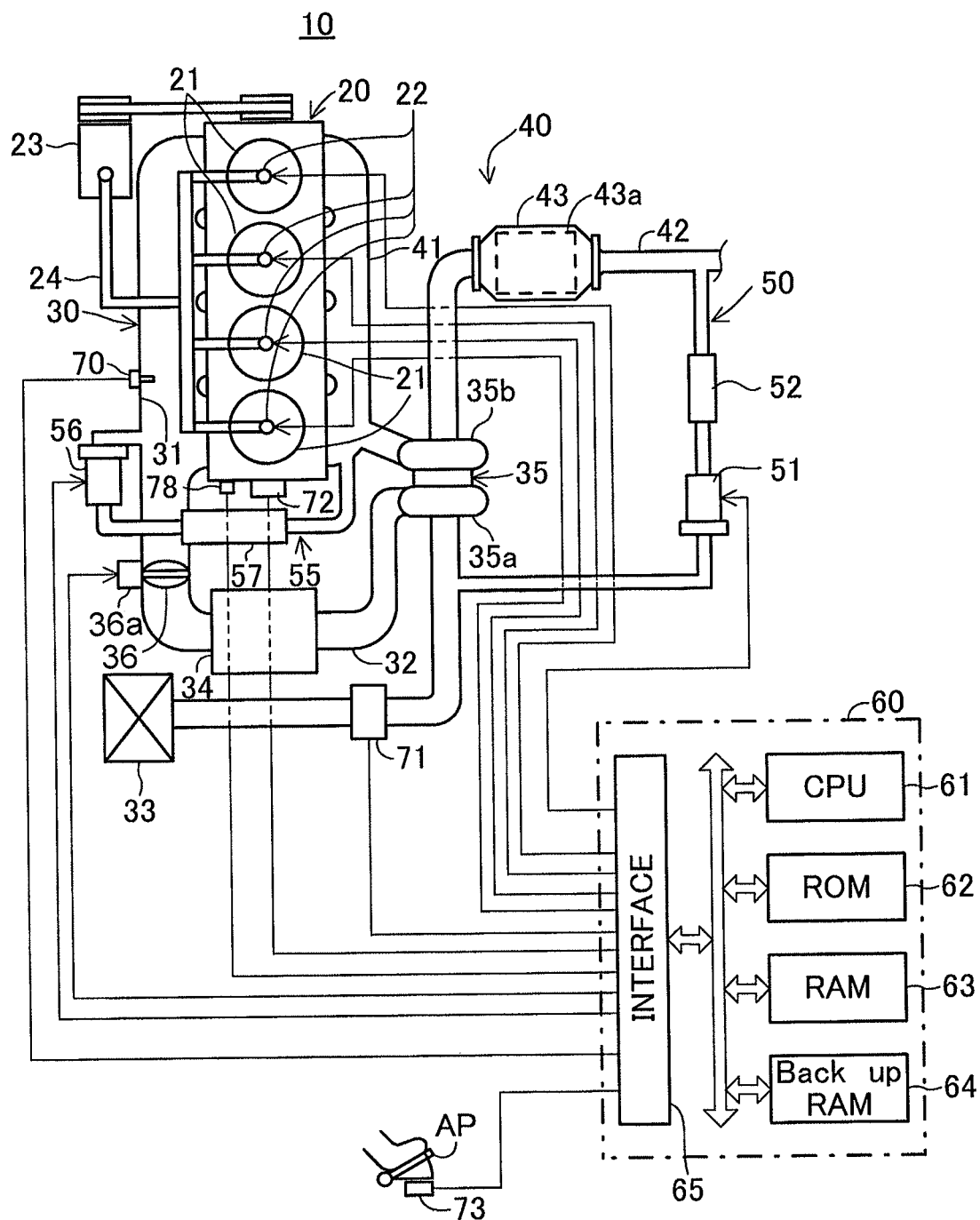
FIG. 1 is an entire view of an engine which an exhaust gas recirculation device of the invention is applied.

Embodiments of the invention will be explained by referring the drawings. FIG. 1 is an entire view of a compression ignition type engine which the exhaust gas recirculation device of the invention is applied.

As shown in FIG. 1, an engine 10 has an engine body 20. In the engine body 20, four combustion chambers 21 are formed. In each combustion chamber 21, a fuel injection valve 22 for injecting fuel into the respective combustion chamber is positioned. Fuel is supplied to each fuel injection valve 22 from a fuel pump 23 via a fuel passage 24.

Further, an intake passage 30 is connected to the engine body 20. The intake passage 30 has an intake manifold 31 connected to intake ports each communicating with the respective combustion chamber 21 and an intake pipe 32 connected to the intake manifold 31. A sensor (hereinafter, this sensor is referred to as "intake gas temperature sensor") 70 is secured to the intake manifold 31 for detecting a temperature of a gas in the intake manifold 31, i.e. a temperature of a gas (hereinafter, this gas is referred to as "intake gas") introduced into each combustion chamber 21. Further, an air cleaner 33, an air flow meter 71 for detecting an amount of air flowing in the intake pipe 32, an intercooler 34 for cooling the gas flowing in the intake pipe 32 and a throttle valve 36 for controlling an amount of the gas flowing in the intake pipe 32 are positioned in the intake pipe 32 along the flow direction of the air. An actuator 36a is secured to the throttle valve 36 for driving the throttle valve 36.

Further, an exhaust passage 40 is connected to the engine body 20. The exhaust passage 40 has an exhaust manifold 41 connected to exhaust ports each communicating with the respective combustion chamber 21 and an exhaust pipe 42 connected to the exhaust manifold. A catalytic converter 43 having a catalyst 43a for purifying specific components, for example, nitrogen oxide and hydrocarbon in the exhaust gas is positioned in the exhaust pipe 42.

The engine 10 has a turbocharger 35. A compressor 35a of the turbocharger 35 is positioned in the intake passage 30, in particular, in the intake pipe 32 upstream of the intercooler 34 and downstream of the air flow meter 71. On the other hand, an exhaust turbine 35b of the turbocharger 35 is positioned in the exhaust passage 40, in particular, in the exhaust pipe 42 upstream of the catalytic converter 43. The exhaust turbine 35b is rotated by the exhaust gas discharged from the combustion chambers 21 and thereby the compressor 35a is rotated.

The engine 10 has an exhaust gas recirculation passage (hereinafter, this exhaust gas recirculation passage is referred to as "first EGR passage") 50 for connecting the exhaust and intake passages 40 and 30 to each other and introducing into the intake passage 30 from the exhaust passage 40 an exhaust gas discharged from the combustion chambers 21. In particular, the first EGR passage 50 connects a part of the exhaust pipe 42 downstream of the exhaust turbine 35b and the catalytic converter 43 and a part of the intake pipe 32 downstream of the compressor 35a and the air flow meter 71 to each other. A control valve (hereinafter, this control valve is referred to as "first EGR control valve") 51 is positioned in the first EGR passage 50 for controlling an amount of the exhaust gas flowing through the first EGR passage 50, i.e. an amount of the exhaust gas introduced from the exhaust passage 40 into the intake passage 30 via the first EGR passage. Further, an EGR cooler 52 is positioned in the first EGR passage 50 for cooling the exhaust gas flowing through the first EGR passage 50.

Further, the engine 10 has an exhaust gas recirculation passage (hereinafter, this exhaust gas recirculation passage is referred to as "second EGR passage") 55 for connecting the exhaust and intake passages 40 and 30 to each other and introducing into the intake passage 30 from the exhaust passage 40 the exhaust gas discharged from the combustion chambers 21. In particular, the second EGR passage 55 connects a part of the exhaust manifold 41 upstream of the exhaust turbine 35b and a part of the intake manifold 31 downstream of the compressor 35a and the throttle valve 35a to each other. A control valve (hereinafter, this control valve is referred to as "second EGR control valve") 56 is positioned in the second EGR passage 55 for controlling an amount of the exhaust gas flowing through the second EGR passage 55, i.e. an amount of the exhaust gas introduced into the intake passage 30 from the exhaust passage 40 via the second EGR passage. Further, an EGR cooler 57 is positioned in the second EGR passage 55 for cooling the exhaust gas flowing through the second EGR passage 55.

Further, the engine 10 has a crank position sensor 72 for detecting a phase angle of a crank shaft, an accelerator opening degree sensor 73 for detecting an amount of depression of an accelerator pedal AP and an electronic control unit (ECU) 60. The crank position sensor 72 produces a narrow pulse signal every the crank shaft rotates 10 degrees and a wide pulse signal every the crank shaft rotates 360 degrees. A rotational speed of the engine (hereinafter, this rotational speed is referred to as "engine speed") is calculated on the basis of the pulse signals produced by the crank position sensor 72.

The electronic control unit (ECU) 60 is constituted by a microcomputer and has a CPU (a microprocessor) 61, a ROM (a read only memory) 62, a RAM (a random access memory) 63, a back-up RAM 64 and an interface 65 including A/D converters, which are connected to each other by a bidirectional bus. The interface 65 is connected to the fuel injection valves 22, the actuator 36a for the throttle valve 36, the first EGR control valve 51 and the second EGR control valve 56. Further, the intake gas temperature sensor 70, the air flow meter 71, the crank position sensor 72 and the accelerator opening degree sensor 73 are connected to the interface 65.

As explained above, in this embodiment (hereinafter, referred to as "first embodiment"), the exhaust gas can be introduced into the combustion chambers 21 by introducing the exhaust gas into the intake passage 30 via the first EGR passage 50 or the second EGR passage 55. In the first embodiment, a ratio (hereinafter, this ratio is referred to as "EGR ratio") of the exhaust gas introduced into the combustion chambers 21 relative to the amount of the gas introduced into the combustion chambers 21, i.e. relative to the total amount of the air and the exhaust gas introduced into the combustion chambers 21, is controlled as follows.

Figure 2:
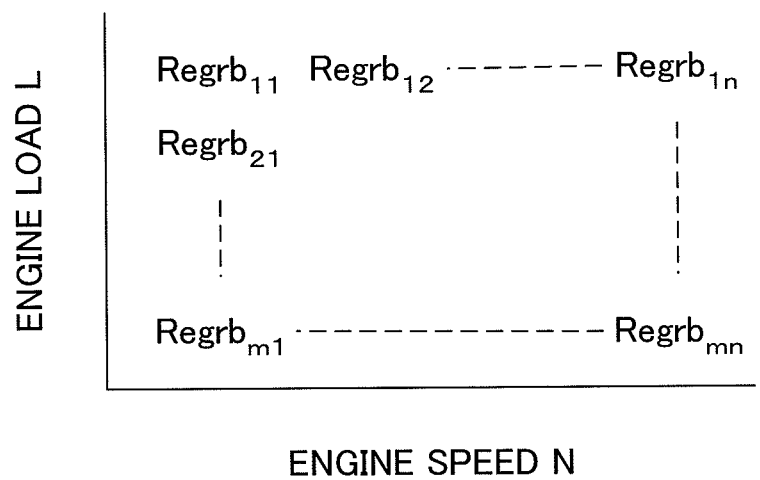
FIG. 2 is a view showing a map used for determining a reference EGR ratio in a first embodiment.

That is, in the first embodiment, most appropriate EGR ratios depending on the engine speed and the engine load (the detail of the most appropriate EGR ratio will be explained later) are previously obtained by an experiment, etc., and the EGR ratios are memorized in the ECU 60 as reference EGR ratios Regrb in the form of a map as a function of the engine speed N and the engine load L as shown in FIG. 2. During the operation of the engine, a reference EGR ratio Regrb is read from the map, depending on the engine speed N and the engine load L, and the reference EGR ratio is set as a target EGR ratio. The amount of the exhaust gas introduced into the intake passage 30 from the exhaust passage 40 via the first EGR passage 50 or the second EGR passage 55 is controlled by the first EGR control valve 51 or the second EGR control valve 56 such that an amount of the exhaust gas which can accomplish the target EGR ratio is introduced into the intake passage 30 from the exhaust passage 40.

As explained above, the reference EGR ratio Regrb defined in the map shown in FIG. 2 is a most appropriate EGR ratio, depending on the engine speed and the engine load. The most appropriate EGR ratio is an EGR ratio which satisfies the following conditions. That is, as the EGR ratio becomes large, the amount of the exhaust gas introduced into the combustion chambers 21 becomes large and the amount of the air introduced into the combustion chambers 21 becomes small. In order to decrease the amount of the nitrogen oxide (hereinafter, this amount is referred to as "NOx production amount") produced along with the combustion of the fuel in the combustion chambers 21 (hereinafter, this combustion is simply referred to as "combustion of the fuel"), it is preferred that the amount of the exhaust gas introduced into the combustion chambers 21 is large. That is, inert gas such as carbon dioxide is included in the exhaust gas, and the inert gas decreases the temperature of the combustion of the fuel in the combustion chambers 21 (hereinafter, this temperature is simply referred to as "temperature of the combustion of the fuel"). Thereby, the NOx production amount decreases. For the reason, in order to decrease the NOx production amount, it is preferred that the amount of the exhaust gas introduced into the combustion chambers 21 is large, i.e. the EGR ratio is large. On the other hand, in order to sufficiently burn in the combustion chambers 21 the fuel injected from the fuel injection valves 22, it is preferred that the amount of the air introduced into the combustion chambers 21 is large, i.e. the EGR ratio is small.

Under the circumstances, the most appropriate EGR ratio is an EGR ratio which can introduce an amount of the air into the combustion chambers 21 for sufficiently burning in the combustion chambers 21 the fuel injected from the fuel injection valves 22 and introduce an amount of the exhaust gas into the combustion chambers 21 for decreasing the NOx production amount as possible. The most appropriate EGR ratio differs, depending on the engine speed and the engine load. The reference EGR ratio defined in the map shown in FIG. 2 is an EGR ratio which can introduce an amount of the air into the combustion chambers 21 for sufficiently burning in the combustion chambers 21 the fuel injected from the fuel injection valves 22 and introduce an amount of the exhaust gas into the combustion chambers 21 for decreasing the NOx production amount as possible.

It should be noted that the amount of the air necessary to sufficiently burn the fuel becomes large, as the engine speed becomes large or the engine load becomes large. For the reason, in the first embodiment, the reference EGR ratio becomes small as the engine speed becomes large in the condition that the engine load is constant and the reference EGR ratio becomes small as the engine load becomes large in the condition that the engine speed is constant.

In the first embodiment, the exhaust gas can be introduced into the intake passage 30 from the exhaust passage 40 via either of the first and second EGR passages 50 and 55. In the first embodiment, the ratio (hereinafter, referred to as "EGR gas ratio") of the amount of the exhaust gas introduced into the intake passage 30 via the first EGR passage 50 (hereinafter, this amount is referred to as "first EGR gas amount") relative to the sum of the first EGR gas amount and the amount of the exhaust gas introduced into the intake passage 30 via the second EGR passage 55 (hereinafter, this amount is referred to as "second EGR gas amount"), i.e. the total amount of the exhaust gas introduced into the intake passage 30, is controlled as follows.

Figure 3:
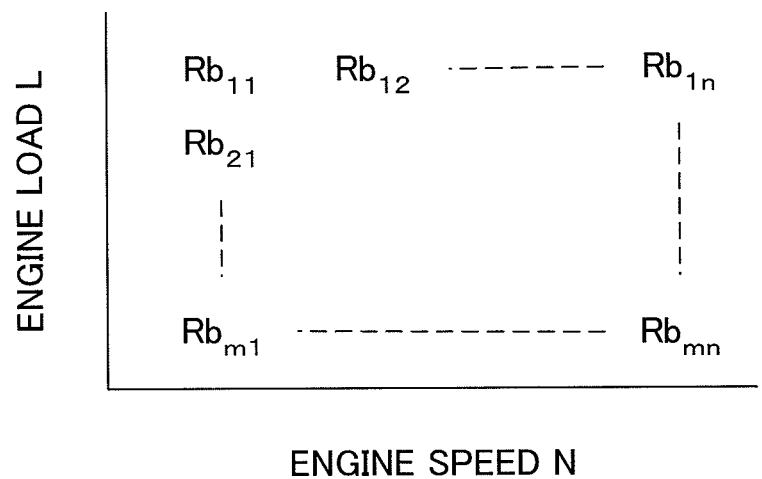
FIG. 3 is a view showing a map used for determining a reference EGR gas ratio in the first embodiment.

That is, in the first embodiment, most appropriate EGR gas ratios (the detail of the most appropriate EGR gas ratio will be explained later), depending on the engine speed and the engine load are previously obtained by an experiment, etc. and the most appropriate ratios are memorized in the ECU 60 as reference EGR gas ratios Rb in the form of a map as a function of the engine speed N and the engine load L as shown in FIG. 3. During the operation of the engine, a reference EGR gas ratio Rb is read from the map shown in FIG. 3, depending on the engine speed N and the engine load L, and the reference EGR gas ratio is set as a target EGR gas ratio. The first and second EGR gas amounts which can accomplish the target EGR gas ratio and the target EGR ratio are set to the first EGR gas amount to be a target (hereinafter, this EGR gas amount is referred to as "target first EGR gas amount") and the second EGR gas amount to be a target (hereinafter, this EGR gas amount is referred to as "target second EGR gas amount"), respectively. The first and second EGR gas amounts are controlled by the first and second EGR control valves 51 and 56, respectively, such that the target first and second EGR gas amounts are accomplished.

As explained above, the reference EGR gas ratio Rb defined in the map shown in FIG. 3 is a most appropriate EGR gas ratio, depending on the engine speed and the engine load. The most appropriate EGR gas ratio is an EGR gas ratio which satisfies the following conditions. That is, as the EGR gas ratio becomes large, the ratio of the first EGR gas amount relative to the amount of the exhaust gas introduced into the combustion chambers 21 becomes large and the ratio of the second EGR gas amount relative to the amount of the exhaust gas introduced into the combustion chambers 21 becomes small. In this regard, for example, in order to decrease the NOx production amount, it is preferred that the first EGR gas amount of the exhaust gas introduced into the combustion chambers 21 is large. That is, since the exhaust gas introduced into the intake passage 30 via the first EGR passage 50 has flown through the exhaust turbine 35b and the catalyst 43a, the temperature of the exhaust gas relatively decreases. Accordingly, when the first EGR gas amount of the exhaust gas introduced into the combustion chambers 21 is large, the temperature of the gas introduced into the combustion chambers 21 is low. Thereby, the temperature of the combustion of the fuel decreases, and therefore the NOx production amount decreases. For the reason, in order to decrease the NOx production amount, it is preferred that the first EGR gas amount of the exhaust gas introduced into the combustion chambers 21 is large, i.e. the EGR gas ratio is large. On the other hand, in order to improve the property of the combustion of the fuel in the combustion chambers 21, it is preferred that the second EGR gas amount of the exhaust gas introduced into the combustion chambers 21 is large. That is, since the exhaust gas introduced into the intake passage 30 via the second EGR passage 55 has been just discharged from the combustion chambers 21, the temperature of the exhaust gas is relatively high. Accordingly, when the second EGR gas amount of the exhaust gas introduced into the combustion chambers 21 is large, the temperature of the gas introduced into the combustion chambers 21 is high. Thereby, the property of the combustion of the fuel in the combustion chambers 21 is improved. For the reason, in order to improve the property of the combustion of the fuel in the combustion chambers 21, it is preferred that the second EGR gas amount of the exhaust gas introduced into the combustion chambers 21 is large, i.e. the EGR gas ratio is small.

Under the circumstances, the most appropriate EGR gas ratio is an EGR gas ratio for introducing into the combustion chambers 21 the first EGR gas amount of the exhaust gas which can decrease the NOx production amount as possible without decreasing the property of the combustion of the fuel beyond an allowable range in the case that an requirement of the decrease of the NOx production amount is more important than the requirement of the improvement of the property of the combustion of the fuel, while the most appropriate EGR gas ratio is an EGR gas ratio for introducing into the combustion chambers 21 the second EGR gas amount of the exhaust gas which can improve the property of the combustion of the fuel as possible without increasing the NOx production amount beyond an allowable range in the case that the requirement of the improvement of the property of the combustion of the fuel is more important than the requirement of the decrease of the NOx production amount. The most appropriate EGR gas ratio differs, depending on the engine speed and the engine load. The reference EGR gas ratio defined in the map shown in FIG. 3 is an EGR gas ratio for introducing into the combustion chambers 21 the first EGR gas amount of the exhaust gas which can decrease the NOx production amount as possible without decreasing the property of the combustion of the fuel beyond the allowable range, or for introducing into the combustion chambers 21 the second EGR gas amount of the exhaust gas which can improve the property of the combustion of the fuel as possible without increasing the NOx production amount beyond the allowable range.

It should be noted that as the engine speed becomes large or the engine load becomes large, the average temperature in the combustion chamber (hereinafter, this temperature is referred to as "cylinder temperature") becomes high, and therefore the requirement of the decrease of the NOx production amount is more important than the requirement of the improvement of the property of the combustion of the fuel. On the other hand, as the engine speed becomes small or the engine load becomes small, the cylinder temperature becomes low, and therefore the requirement of the improvement of the property of the combustion of the fuel is more important than the requirement of the decrease of the NOx production amount. For the reason, in the first embodiment, the reference EGR gas ratio becomes large as the engine speed becomes large in the condition that the engine load is constant and the reference EGR gas ratio becomes large as the engine load becomes large in the condition that the engine speed is constant.

As explained above, in the first embodiment, the reference EGR gas ratio is set to an EGR gas ratio for introducing into the combustion chambers 21 the first EGR gas amount of the exhaust gas which can decrease the NOx production amount as possible without decreasing the property of the combustion of the fuel beyond the allowable range, or is set to an EGR gar ratio for introducing into the combustion chambers 21 the second EGR gas amount of the exhaust gas which can improve the property of the combustion of the fuel as possible without increasing the NOx production amount beyond the allowable range. In other words, the reference EGR gas ratio is set to an EGR gas ratio for introducing into the combustion chambers 21 the first EGR gas amount of the exhaust gas which can decrease the NOx production amount as possible when the cylinder temperature is relatively high, or is set to an EGR gas ratio for introducing into the combustion chambers 21 the second EGR gas amount of the exhaust gas which can improve the property of the combustion of the fuel as possible when the cylinder temperature is relatively low. That is, in the first embodiment, on the assumption that a parameter largely relating to the NOx production amount is the cylinder temperature, the reference EGR gas ratio is set.

However, by the study of the inventors of this application, it is realized that the highest temperature of the flame (hereinafter, this temperature is referred to as "maximum flame temperature") out of the temperatures of the flame (hereinafter, this temperature is simply referred to as "flame temperature") generated by the combustion of the fuel in the combustion chambers 21 rather than the cylinder temperature largely relates to the NOx production amount when the maximum flame temperature is higher than a certain temperature. That is, the cylinder temperature is an average temperature in the combustion chamber 21, and therefore even when the cylinder temperature is relatively low, the maximum flame temperature may be extremely high, and in this case, the NOx production amount is relatively large. That is, in this case, compared with the cylinder temperature, the maximum flame temperature largely relates to the NOx production amount.

In the first embodiment, maximum flame temperatures largely relating to the NOx production amount, compared with the cylinder temperature are previously obtained by an experiment, etc. and the maximum flame temperatures are set as allowable upper limit flame temperatures, and when the maximum flame temperature is higher than the allowable upper limit flame temperature, the target EGR gas ratio is set as follows.

Figure 4:
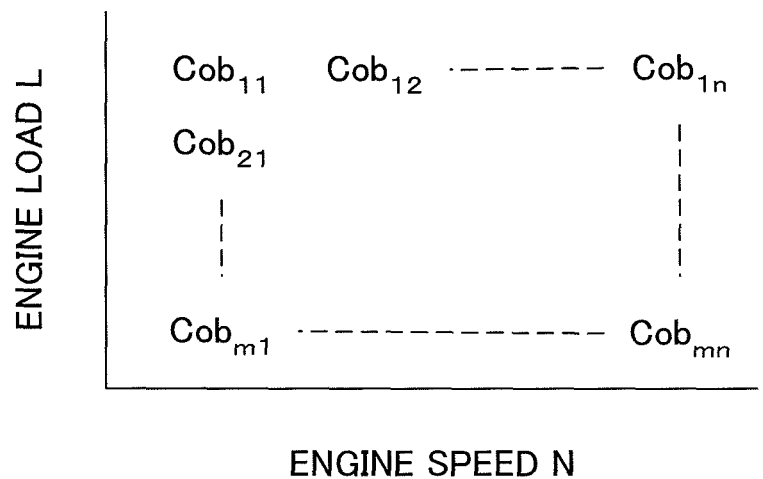
FIG. 4 is a view showing a map used for determining a reference oxygen concentration in the first embodiment.

That is, in the first embodiment, concentrations of the oxygen in the gas introduced into the combustion chambers 21 for decreasing the maximum flame temperature to a temperature lower than or equal to the allowable upper limit flame temperature, depending on the engine speed and the engine load are previously obtained by an experiment, etc. and the concentrations of the oxygen are memorized in the ECU 60 as reference oxygen concentrations in the form of a map as a function of the engine speed N and the engine load L as shown in FIG. 4. When the maximum flame temperature is higher than the allowable upper limit flame temperature, a reference oxygen concentration Cob is read from the map shown in FIG. 4, depending on the engine speed N and the engine load L, and then the reference oxygen concentration is set as a target oxygen concentration. Then, the target EGR gas ratio is set to zero, that is, the target first EGR gas amount is set to zero and a second EGR gas amount which can accomplish the target oxygen concentration, is set as the target second EGR gas amount. Then, the opening degrees of the first and second EGR control valves 51 and 56 are controlled, respectively, such that the first EGR gas amount becomes zero and the target second EGR gas amount of the second EGR gas is introduced into the intake passage 30.

According to this, when the maximum flame temperature is higher than the allowable upper limit flame temperature, the maximum flame temperature is quickly and surely controlled to a temperature lower than or equal to the allowable upper limit flame temperature.

That is, the maximum flame temperature largely depends on the concentration of the oxygen in the gas introduced into the combustion chambers 21, compared with the temperature of the gas introduced into the combustion chambers 21. Accordingly, in order to control the maximum flame temperature to a temperature lower than or equal to the allowable upper limit flame temperature, it is necessary to decrease the concentration of the oxygen in the gas introduced into combustion chambers 21. In this regard, according to the first embodiment, the first EGR gas amount becomes zero and the target second EGR gas amount, i.e. the second EGR gas amount of the exhaust gas which can introduce into the combustion chambers 21 the gas having a concentration of the oxygen which can make the maximum flame temperature a temperature lower than or equal to the allowable upper limit flame temperature, is introduced into the intake passage 30, and therefore the maximum flame temperature is surely controlled to a temperature lower than or equal to the allowable upper limit flame temperature.

Further, in order to introduce into the combustion chambers 21 the gas having the target oxygen concentration (i.e. the oxygen concentration which can make the maximum flame temperature to a temperature lower than or equal to the allowable upper limit flame temperature), for example, the target second EGR gas amount may be set to zero and a first EGR gas amount which can accomplish the target oxygen concentration, may be set as the target first EGR gas amount, and then the opening degrees of the first and second EGR control valves 51 and 56 may be controlled, respectively, such that the second EGR gas amount becomes zero and the target first EGR gas amount of the first EGR gas is introduced into the intake passage 30. However, compared with the exhaust gas introduced into the intake passage 30 via the first EGR passage 50, the exhaust gas introduced into the intake passage 30 via the second EGR passage 55 early reaches the combustion chambers 21. That is, when the concentration of the oxygen in the gas introduced into the combustion chambers 21 should be controlled to the target oxygen concentration, the concentration of the oxygen is quickly controlled to the target oxygen concentration by controlling the concentration of the oxygen to the target oxygen concentration on the basis of the control of the second EGR gas amount, rather than by controlling the concentration of the oxygen to the target oxygen concentration on the basis of the control of the first EGR gas amount. For the reason, according to the first embodiment, when the maximum flame temperature is higher than the allowable upper limit flame temperature, the maximum flame temperature is quickly controlled to a temperature lower than or equal to the allowable upper limit flame temperature.

It should be noted that in the first embodiment, when the maximum flame temperature is lower than or equal to the allowable upper limit temperature, the reference EGR ratio determined on the basis of the map shown in FIG. 2, depending on the engine speed N and the engine load L is set as the target EGR ratio and the reference EGR gas ratio determined on the basis of the map shown in FIG. 3, depending on the engine speed N and the engine load L is set as the target EGR gas ratio, and then the first and second EGR gas amounts are controlled by the first and second EGR control valves 51 and 56, respectively, such that the target EGR ratio and the target EGR gas ratio are accomplished.

Accordingly, in the first embodiment, when the maximum flame temperature is lower than or equal to the allowable upper limit flame temperature, the concentration of the oxygen in the gas introduced into the combustion chambers 21 is controlled, considering the temperature of the gas introduced into the combustion chambers 21, while when the maximum flame temperature is higher than the allowable upper limit flame temperature, the concentration of the oxygen in the gas introduced into the combustion chambers 21 is controlled, without considering the temperature of the gas introduced into the combustion chambers 21.

Further, in the first embodiment, the concentration of the oxygen which can make the maximum flame temperature a temperature lower than or equal to the allowable upper limit flame temperature, depending on the engine speed and the engine load, is employed as the target oxygen concentration (i.e. the reference oxygen concentration). However, in place of such a concentration of the oxygen, a concentration of the oxygen which can make the maximum flame temperature a temperature lower than or equal to the allowable upper limit temperature, independently of the engine speed and the engine load, may be employed. In this case, it is unnecessary to calculate the target oxygen concentration, depending on the engine speed and the engine load, and therefore an advantage that the load of the calculation of the target second EGR gas amount can become small, can be obtained.

Further, in the first embodiment, the reference oxygen concentration read from the map shown in FIG. 4 is set as the target oxygen concentration. However, in place of this, the reference oxygen concentration corrected, depending on the difference between the maximum flame temperature and the allowable upper limit flame temperature (hereinafter, this difference is referred to as "flame temperature difference") may be set as the target oxygen concentration. For example, in this case, as the flame temperature difference becomes large, the reference oxygen concentration may be corrected such that it decreases progressively, or as the flame temperature difference becomes large, the reference oxygen concentration may be corrected such that it decreases continuously. In this case, as the maximum flame temperature becomes high relative to the allowable upper limit flame temperature, the concentration of the oxygen in the gas introduced into the combustion chambers is decreased, and therefore an advantage that the maximum flame temperature can be quickly decreased to a temperature lower than or equal to the allowable upper limit flame temperature, can be obtained.

Further, in the first embodiment, the first EGR gas amount is controlled by controlling the opening degree of the first EGR control valve 51, however the first EGR gas amount changes, depending on the opening degree of the throttle valve 36 even when the opening degree of the first EGR control valve 51 is constant. Accordingly, in the first embodiment, the first EGR gas amount may be controlled by controlling the opening degrees of the first EGR control valve 51 and the throttle valve 36.

Figure 5:
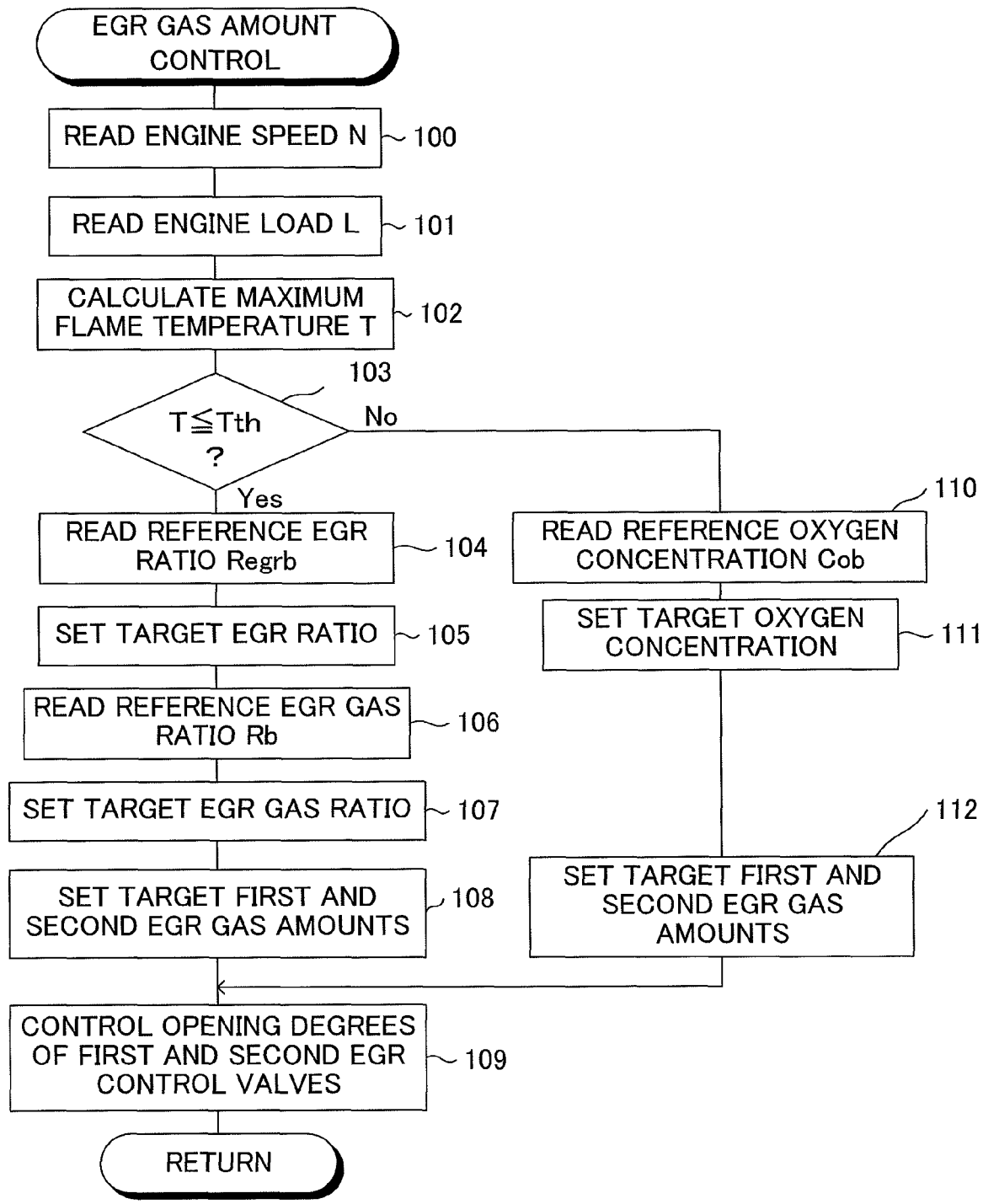
FIG. 5 is a view showing an example of a flow chart for performing a control of EGR gas amounts according to the first embodiment.

Next, an example of a flow chart for performing a control of the EGR gas amounts according to the first embodiment will be explained. For the control of the EGR gas amounts according to the first embodiment, a flow chart shown in FIG. 5 is used. The routine of FIG. 5 is performed every a predetermined timing comes.

When the routine of FIG. 5 is initiated, first, at step 100, the engine speed N is read. Next, at step 101, the engine load L is read. Next, at step 102, the maximum flame temperature T is calculated by the following expression 1.

$$T = \Delta H / (Cpk + Cpa \cdot (A/Fst) \cdot 23.2 / Roxc) + Tctop \quad (1)$$

In the above expression 1, $\Delta H$ is a lower heating value of the fuel, Cpk is a specific heat of the fuel, Cpa is a specific heat of the gas in the combustion chamber 21, A/Fst is a stoichiometric air-fuel ratio, Roxc is a concentration of the oxygen in the gas in the combustion chamber 21, Tctop is a cylinder temperature when the piston reaches the top dead center in the combustion chamber 21, and 23.2 is a mass fraction of the oxygen in the air.

Further, the cylinder temperature Tctop used in the above expression 1 is calculated by the following expression 2.

$$Tctop = Tcini \cdot \epsilon(\kappa - 1) \quad (2)$$

In the above expression 2, Tcini is a temperature of the gas introduced into the combustion chamber 21, $\epsilon$ is a compression ratio in the combustion chamber 21, and $\kappa$ is a ratio of the specific heat of the gas introduced into the combustion chamber 21.

Next, at step 103, it is judged if the maximum flame temperature T calculated at step 102 is lower than or equal to the allowable upper limit flame temperature Tth (T≤Tth). When it is judged that T≤Tth, the routine proceeds to step 104 and the steps following it. On the other hand, when it is judged that T>Tth, the routine proceeds to step 110 and the steps following it.

When it is judged that T≤Tth at step 103 and the routine proceeds to step 104, a reference EGR ratio Regrb is read from the map shown in FIG. 2, depending on the engine speed N read at step 100 and the engine load L read at step 101. Next, at step 105, the reference EGR ratio Regrb read at step 104 is set as the target EGR ratio. Next, at step 106, a reference EGR gas ratio Rb is read from the map shown in FIG. 3, depending on the engine speed N read at step 100 and the engine load L read at step 101. Next, at step 107, the reference EGR gas ratio Rb read at step 106 is set as the target EGR gas ratio. Next, at step 108, target first and second EGR gas amounts are set such that the target EGR ratio set at step 105 and the target EGR gas ratio set at step 107 are accomplished. Next, at step 109, the opening degrees of the first and second EGR control valves 51 and 56 are controlled, respectively, such that the target first and second EGR gas amounts set at step 108 are accomplished and then the routine is terminated.

On the other hand, when it is judged that T>Tth at step 103 and the routine proceeds to step 110, a reference oxygen concentration Cob is read from the map shown in FIG. 4, depending on the engine speed N read at step 100 and the engine load L read at step 101. Next, at step 111, the reference oxygen concentration Cob read at step 110 is set as the target oxygen concentration. Next, at step 112, the target first EGR gas amount is set to zero and the target second EGR gas amount is set such that the target oxygen concentration set at step 111 is accomplished. Next, at step 109, the opening degrees of the first and second EGR control valves 51 and 56 are controlled, respectively, such that the target first and second EGR gas amounts set at step 112 are accomplished and then the routine is terminated.

In the above-explained first embodiment, when the maximum flame temperature is higher than the allowable upper limit flame temperature, the target first and second EGR gas amounts may be set as follows.

That is, in this embodiment (hereinafter, referred to as "second embodiment"), when the maximum flame temperature is higher than the allowable upper limit flame temperature, a reference EGR ratio Regrb is read from the map shown in FIG. 2, depending on the engine speed N and the engine load L. Then, in the second embodiment, an EGR ratio larger than the reference EGR ratio read as explained above is set as the target EGR ratio. Then, the target first EGR gas amount is set to zero and the second EGR gas amount which can accomplish the above-mentioned target EGR ratio is set as the target second EGR gas amount.

Then, the first and second EGR gas amounts are controlled by the first and second EGR control valves 51 and 56, respectively, such that the target first and second EGR gas amounts set as explained above are accomplished.

According to the second embodiment, as can be realized from the reason explained in relation with the first embodiment, when the maximum flame temperature is higher than the allowable upper limit flame temperature, the maximum flame temperature is quickly and surely decreased. That is, in the second embodiment, the EGR ratio when the maximum flame temperature is higher than the allowable upper limit flame temperature, is larger than the reference EGR ratio set as the target EGR ratio read from the map shown in FIG. 2 when the maximum flame temperature is lower than or equal to the allowable upper limit flame temperature. In this regard, the maximum flame temperature is resulted from the setting of the reference EGR ratio read from the map shown in FIG. 2 as the target EGR ratio and the control of the EGR ratio to the target EGR ratio. In other words, when the maximum flame temperature becomes higher than the allowable upper limit flame temperature, the maximum flame temperature becomes higher than the allowable upper limit flame temperature as a result of the control of the EGR ratio to the target EGR ratio. Accordingly, when the maximum flame temperature becomes higher than the allowable upper limit flame temperature, if the EGR ratio is larger than the reference EGR ratio read from the map shown in FIG. 2, the concentration of the oxygen in the gas introduced into the combustion chambers 21 decreases, and therefore the maximum flame temperature decreases.

Further, the second embodiment has a following advantage, compared with the first embodiment. That is, in the second embodiment, when the maximum flame temperature is higher than the allowable upper limit flame temperature, simply, an EGR ratio larger than the reference EGR ratio is set as the target EGR ratio and the target second EGR gas amount is set on the basis of the target EGR ratio. That is, the target second EGR gas amount is set without using the concentration of the oxygen in the gas introduced into the combustion chambers as a parameter to be directly controlled. On the other hand, in the first embodiment, when the maximum flame temperature is higher than the allowable upper limit temperature, the target oxygen concentration (i.e. the concentration of the oxygen in the gas introduced into the combustion chambers) is set, depending on the engine speed and the engine load and the target second EGR gas amount is set on the basis of the target oxygen concentration. That is, the target second EGR gas amount is set by using the concentration of the oxygen in the gas introduced into the combustion chambers as a parameter to be directly controlled. Generally, the load of the calculation relating to the setting of the target second EGR gas amount is small by setting the target second EGR gas amount in order to control the EGR ratio to the target EGR ratio, rather than by setting the target second EGR gas amount in order to control the concentration of the oxygen in the gas introduced into the combustion chamber to the target oxygen concentration. For the reason, the second embodiment has an advantage that the target second EGR gas amount can be set by a small load of the calculation, compared with the first embodiment.

Of course, from the opposite view point, the first embodiment has a following advantage, compared with the second embodiment. That is, when the maximum flame temperature is higher than the allowable upper limit flame temperature, the maximum flame temperature largely relates to the NOx production amount and the concentration of the oxygen in the gas introduced into the combustion chambers largely relates to the maximum flame temperature. In the first embodiment, when the maximum flame temperature is higher than the allowable upper limit flame temperature, the concentration of the oxygen in the gas introduced into the combustion chambers is used as a parameter to be directly controlled, and therefore the maximum flame temperature is quickly and surely controlled to a temperature lower than or equal to the allowable upper limit flame temperature. For the reason, the first embodiment has an advantage that the NOx production amount can be quickly and surely controlled to an allowable range, compared with the second embodiment.

It should be noted that in the second embodiment, the target EGR ratio may be set to an EGR ratio larger than the reference EGR ratio by a constant value, independently of the difference between the maximum flame temperature and the allowable upper limit flame temperature, i.e. the flame temperature difference or the target EGR ratio may be set to an EGR ratio larger than the reference EGR ratio, depending on the flame temperature difference. For example, in the case that the target EGR ratio is set to an EGR ratio larger than the reference EGR ratio, depending on the flame temperature difference, the target EGR ratio may be set to an EGR ratio which progressively increases as the flame temperature difference becomes large or the target EGR ratio may be set to an EGR ratio which continuously increases as the flame temperature difference becomes large. In this case, the concentration of the oxygen in the gas introduced into the combustion chamber is decreased as the maximum flame temperature becomes high relative to the allowable upper limit flame temperature, and therefore an advantage that the maximum flame temperature can be quickly decreased to a temperature lower than or equal to the allowable upper limit flame temperature, can be obtained.

Figure 6:
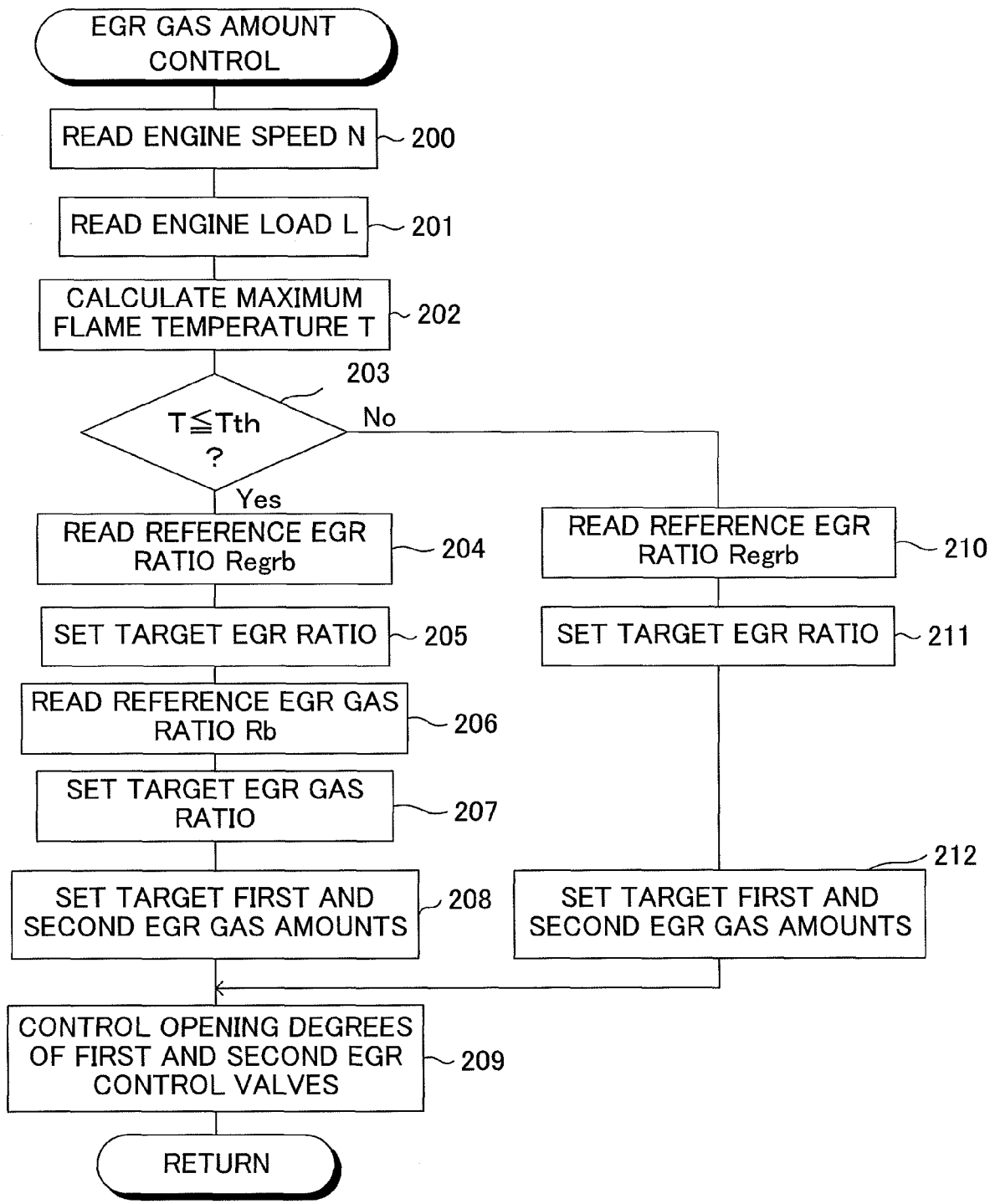
FIG. 6 is a view showing an example of a flow chart for performing a control of EGR gas amounts according to a second embodiment.

Next, an example of a flow chart for performing a control of the EGR gas amounts according to the second embodiment will be explained. For the control of the EGR gas amounts according to the second embodiment, a flow chart shown in FIG. 6 is used. The routine of FIG. 6 is performed every a predetermined timing comes. It should be noted that the steps 200-208 shown in FIG. 6 are the same as the steps 100-108 of the flow chart shown in FIG. 5, and therefore the explanations thereof will be omitted.

In the routine of FIG. 6, when at step 203, it is judged that T>Tth, that is, it is judged that the maximum flame temperature T is higher than the allowable upper limit flame temperature Tth and the routine proceeds to step 210, a reference EGR ratio Regrb is read from the map shown in FIG. 2, depending on the engine speed N and the engine load L. Next, at step 211, an EGR ratio larger than the reference EGR ratio read at step 210 by a constant value is set as the target EGR ratio. Next, at step 212, the target first EGR gas amount is set to zero and the second EGR gas amount which can accomplish the target EGR ratio set at step 211 in the condition that the first EGR gas amount is zero, is set as the target second EGR gas amount. Next, at step 209, the opening degrees of the first and second EGR control valves 51 and 56 are controlled, respectively, such that the target first and second EGR gas amounts set at step 212 are accomplished and then the routine is terminated.

In the above-explained first embodiment, when the maximum flame temperature is higher than the allowable upper limit flame temperature, the target first and second EGR gas amounts may be set as follows.

That is, in this embodiment (hereinafter, referred to as "third embodiment"), when the maximum flame temperature is higher than the allowable upper limit flame temperature, a reference EGR ratio Regrb is read from the map shown in FIG. 2, depending on the engine speed N and the engine load L and a reference EGR gas ratio Rb is read from the map shown in FIG. 3, depending on the engine speed N and the engine load L. Then, the first and second EGR gas amounts which can accomplish the reference EGR ratio and the reference EGR gas ratio, are calculated as reference first and second EGR gas amounts, respectively. Then, the reference first EGR gas amount calculated as explained above is set as the target first EGR gas amount. On the other hand, the target second EGR gas amount is set as follows.

That is, in the third embodiment, a reference oxygen concentration Cob is read from the map shown in FIG. 4, depending on the engine speed N and the engine load L and the reference oxygen concentration is set as the target oxygen concentration. Then, the second EGR gas amount which can make the oxygen concentration in the gas introduced into the combustion chamber 21 the target oxygen concentration in the condition that the first EGR gas amount of the first EGR gas is introduced into the intake passage 30, is set as the target second EGR gas amount.

Then, the first and second EGR gas amounts are controlled by the first and second EGR control valves 51 and 56, respectively, such that the target first and second EGR gas amounts set as explained above are accomplished.

According to the third embodiment, for the same reason as that explained in relation with the first embodiment, when the maximum flame temperature is higher than the allowable upper limit flame temperature, the maximum flame temperature is quickly and surely controlled to a temperature lower than or equal to the allowable upper limit flame temperature.

Further, the third embodiment has a following advantage, compared with the first and second embodiments. That is, in the third embodiment, when the maximum flame temperature is higher than the allowable upper limit flame temperature, a reference first EGR gas amount is calculated on the basis of the reference EGR ratio obtained by the map shown in FIG. 2 and the reference EGR gas ratio obtained by the map shown in FIG. 3 and the reference first EGR gas amount is set as the target first EGR gas amount and then the first EGR gas amount is controlled to the target EGR gas amount. On the other hand, in the first and second embodiments, when the maximum flame temperature is higher than the allowable upper limit flame temperature, the first EGR gas amount is simply controlled to zero. In this regard, in either embodiments, when the maximum flame temperature changes from a temperature higher than the allowable upper limit flame temperature to a temperature lower than or equal to the allowable upper limit flame temperature, reference first and second EGR gas amounts are calculated, respectively, on the basis of the reference EGR ratio obtained by the map shown in FIG. 2 and the reference EGR gas ratio obtained by the map shown in FIG. 3 and the reference first and second EGR gas amounts are set as the target first and second EGR gas amounts, respectively, and then the first and second EGR gas amounts are controlled to the target first and second EGR gas amounts, respectively. Accordingly, as in the first and second embodiments, if the first EGR gas amount is controlled to zero when the maximum flame temperature is higher than the allowable upper limit flame temperature, it takes relatively long time to control the first EGR gas amount to the target first EGR gas amount at the time when the maximum flame temperature becomes lower than or equal to the allowable upper limit flame temperature later. However, as in the third embodiment, if the first EGR gas amount is controlled to the target first EGR gas amount equal to the reference first EGR gas amount when the maximum flame temperature is higher than the allowable upper limit flame temperature, it takes relatively short time to control the first EGR gas amount to the target first EGR gas amount at the time when the maximum flame temperature becomes lower than or equal to the allowable upper limit flame temperature later. For the reason, compared with the first and second embodiments, the third embodiment has an advantage that the first EGR gas amount can be quickly controlled to the target first EGR gas amount at the time when the maximum flame temperature changes from a temperature higher than the allowable upper limit flame temperature to a temperature lower than or equal to the allowable upper limit flame temperature.

Of course, in the opposite view point, the first and second embodiments have a following advantage, compared with the third embodiment. That is, in the first and second embodiments, when the maximum flame temperature is higher than the allowable upper limit flame temperature, the first EGR gas amount is controlled to zero. On the other hand, in the third embodiment, when the maximum flame temperature is higher than the allowable upper limit flame temperature, the first EGR gas amount is controlled to the target first EGR gas amount equal to the reference first EGR gas amount calculated on the basis of the reference EGR ratio and the reference EGR gas ratio. In this regard, the second EGR gas amount is relatively large in the case that the first EGR gas amount is controlled to zero, compared with the case that the first EGR gas amount is controlled to the target first EGR gas amount as explained above. As explained above, the second EGR gas early reaches the combustion chamber, compared with the first EGR gas. Further, the second EGR gas largely influences the maximum flame temperature when the second EGR gas amount is changed in the case that the second EGR gas amount is relatively large. Accordingly, compared with the case that the first EGR gas amount is controlled to zero as in the third embodiment, the second EGR gas largely influences the maximum flame temperature when the second EGR gas amount is changed in the case that the first EGR gas amount is controlled to the target first EGR gas amount as in the first and second embodiments. For the reason, compared with the third embodiment, the first and second embodiments have an advantage that the maximum flame temperature can be quickly decreased when the maximum flame temperature is higher than the allowable upper limit flame temperature.

Further, the third embodiment has a following advantage, compared with the second embodiment. That is, when the maximum flame temperature is higher than the allowable upper limit flame temperature, the maximum flame temperature largely relates to the NOx production amount and the concentration of the oxygen in the gas introduced into the combustion chambers largely relates to the maximum flame temperature. Then, in the third embodiment, when the maximum flame temperature is higher than the allowable upper limit flame temperature, the concentration of the oxygen in the gas introduced into the combustion chambers is used as a parameter to be directly controlled, and therefore the maximum flame temperature is quickly and surely controlled to a temperature lower than or equal to the allowable upper limit flame temperature. For the reason, compared with the second embodiment, the third embodiment has an advantage that the NOx production amount can be quickly and surely restricted within an allowable range.

Of course, in the opposite view point, the second embodiment has a following advantage, compared with the third embodiment. That is, as explained above, in the second embodiment, when the maximum flame temperature is higher than the allowable upper limit flame temperature, simply, an EGR ratio larger than the reference EGR ratio is set as the target EGR ratio and the target second EGR gas amount is set on the basis of the target EGR ratio. That is, the target second EGR gas amount is set without using the concentration of the oxygen in the gas introduced into the combustion chamber as a parameter to be directly controlled. On the other hand, in the third embodiment, when the maximum flame temperature is higher than the allowable upper limit flame temperature, the target oxygen concentration (i.e. the concentration of the oxygen in the gas introduced into the combustion chambers) is set, depending on the engine speed and the engine load and the target second EGR gas amount is set on the basis of the target oxygen concentration. That is, the target second EGR gas amount is set by using the concentration of the oxygen in the gas introduced into the combustion chambers as a parameter to be directly controlled. Generally, compared with the case that the target second EGR gas amount is set in order to control the concentration of the oxygen in the gas introduced into the combustion chamber to the target oxygen concentration, the load of the calculation relating to the setting of the target second EGR gas amount is small in the case that the target second EGR gas amount is set in order to control the EGR ratio to the target EGR ratio. For the reason, compared with the first embodiment, the second embodiment has an advantage that the target second EGR gas amount can be set by a small load of the calculation.

Figure 7:
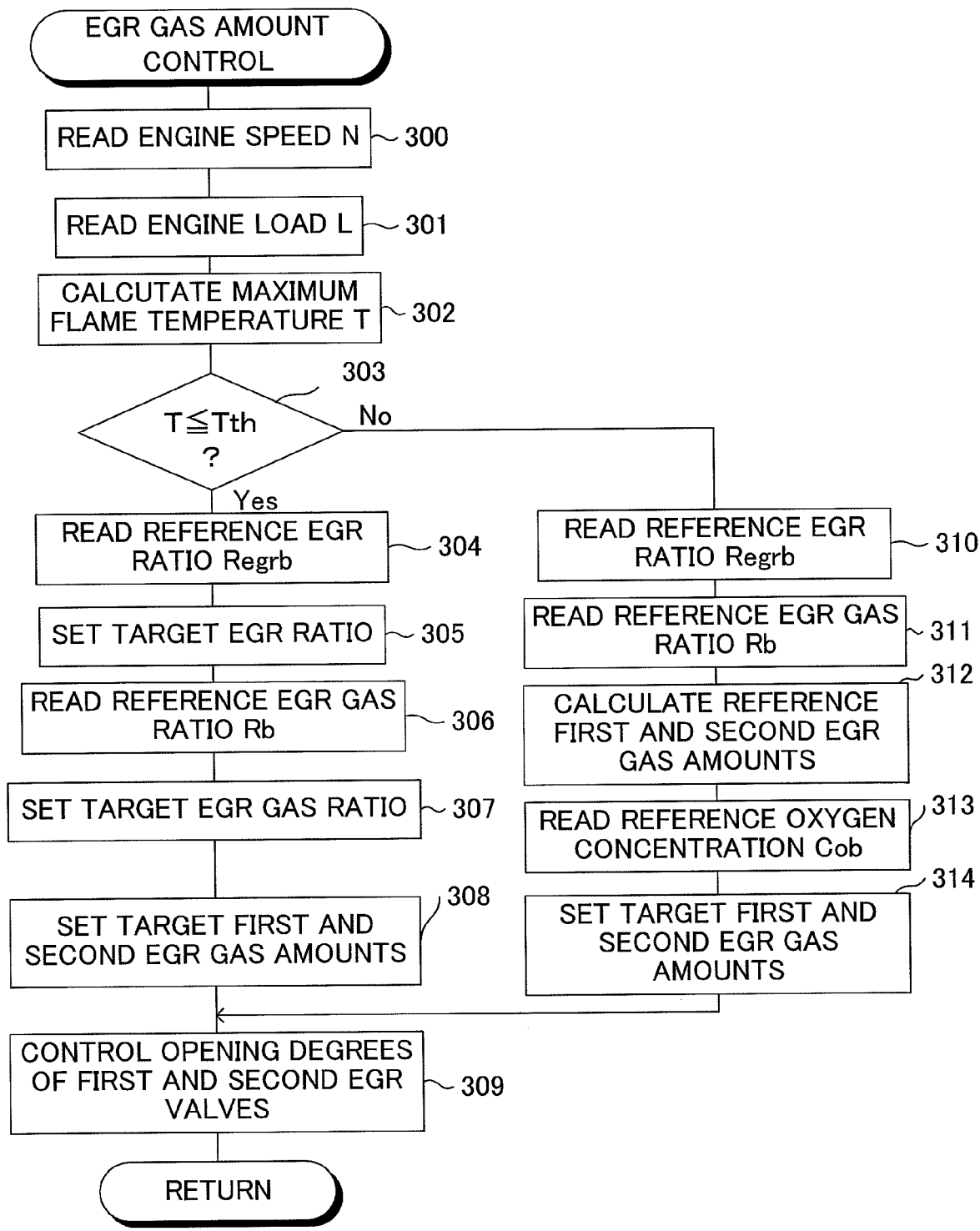
FIG. 7 is a view showing an example of a flow chart for performing a control of EGR gas amounts according to a third embodiment.

Next, an example of a flow chart for performing a control of the EGR gas amounts according to the third embodiment. For the control of the EGR gas amounts according to the third embodiment, a flow chart shown in FIG. 7 is used. The routine of FIG. 7 is performed every a predetermined timing comes. It should be noted that the steps 300-308 of the flow chart shown in FIG. 7 are the same as the steps 100-108 of the flow chart shown in FIG. 5, and therefore the explanations thereof will be omitted.

In the routine of FIG. 7, when at step 303, it is judged that T>Tth, that is, it is judged that the maximum flame temperature T is higher than the allowable upper limit flame temperature Tth and the routine proceeds to step 310, a reference EGR ratio Regrb is read from the map shown in FIG. 2, depending on the engine speed N and the engine load L. Next, at step 311, a reference EGR gas ratio Rb is read from the map shown in FIG. 3, depending on the engine speed N and the engine load L. Next, at step 312, the first and second EGR gas amounts which can accomplish the reference EGR ratio Regrb read at step 310 and the reference EGR gas ratio Rb read at step 311, are calculated as the reference first and second gas amounts, respectively. Next, at step 313, a reference oxygen concentration Cob is read from the map shown in FIG. 4, depending on the engine speed N and the engine load L. Next, at step 314, the reference first EGR gas amount calculated at step 312 is set as the target first EGR gas amount and the second EGR gas amount which can make the concentration of the oxygen in the gas introduced into the combustion chambers 21 the reference oxygen concentration read at step 313 in the condition that the target first EGR gas amount of the first EGR gas is introduced into the intake passage 30, is set as the target second EGR gas amount. Next, at step 309, the opening degrees of the first and second EGR control valves 51 and 56 are controlled, respectively, such that the target first and second EGR gas amounts set at step 314 are accomplished and then the routine is terminated.

In the above-explained first embodiment, when the maximum flame temperature is higher than the allowable upper limit flame temperature, the target first and second EGR gas amounts may be set as follows.

That is, in this embodiment (hereinafter, referred to as "fourth embodiment"), when the maximum flame temperature is higher than the allowable upper limit flame temperature, a reference EGR ratio Regrb is read from the map shown in FIG. 2, depending on the engine speed N and the engine load L and a reference EGR gas ratio Rb is read from the map shown in FIG. 3, depending on the engine speed N and the engine load L. Then, the first and second EGR gas amounts which can accomplish the reference EGR ratio and the reference EGR gas ratio, are calculated as the reference first and second EGR gas amounts, respectively. Then, the reference first EGR gas amount calculated as explained above is set as the target first EGR gas amount. On the other hand, an EGR gas amount larger than the reference second EGR gas amount calculated as explained above is set as the target second EGR gas amount.

Then, the first and second EGR gas amounts are controlled by the first and second EGR control valves 51 and 56, respectively, such that the target first and second EGR gas amounts set as explained above are accomplished.

According to the fourth embodiment, as can be realized from the reason explained in relation with the first embodiment, when the maximum flame temperature is higher than the allowable upper limit flame temperature, the maximum flame temperature is quickly and surely decreased. That is, in the fourth embodiment, the EGR ratio when the maximum flame temperature is higher than the allowable upper limit flame temperature is lager than the reference EGR ratio set as the target EGR ratio read from the map shown in FIG. 2 when the maximum flame temperature is lower than or equal to the allowable upper limit flame temperature, as a result. In this regard, the maximum flame temperature is resulted from the setting of the reference EGR ratio read from the map shown in FIG. 2 as the target EGR ratio and the control of the EGR ratio to the target EGR ratio. In other words, when the maximum flame temperature becomes higher than the allowable upper limit flame temperature, the maximum flame temperature becomes the allowable upper limit flame temperature as a result of the control of the EGR ratio to the target EGR ratio. Accordingly, when the maximum flame temperature becomes higher than the allowable upper limit flame temperature, if the EGR ratio is larger than the reference EGR ratio read from the map shown in FIG. 2, the concentration of the oxygen in the gas introduced into the combustion chamber 21 decreases, and therefore the maximum flame temperature decreases.

Further, the fourth embodiment has a following advantage, compared with the first and third embodiments. That is, in the fourth embodiment, when the maximum flame temperature is higher than the allowable upper limit flame temperature, simply, an EGR gas amount larger than the reference second EGR gas amount which can accomplish the target EGR ratio, is set as the target second EGR gas amount. That is, the target second EGR gas amount is set without using the concentration of the oxygen in the gas introduced into the combustion chamber as a parameter to be directly controlled. On the other hand, in the first and third embodiments, when the maximum flame temperature is higher than the allowable upper limit flame temperature, the target oxygen concentration (i.e. the concentration of the oxygen in the gas introduced into the combustion chambers) is set, depending on the engine speed and the engine load and the target second EGR gas amount is set on the basis of the target oxygen concentration. That is, the target second EGR gas amount is set by using the concentration of the oxygen in the gas introduced into the combustion chamber as a parameter to be directly controlled. Generally, compared with the case that the target second EGR gas amount is set in order to control the concentration of the oxygen in the gas introduced into the combustion chamber to the target oxygen concentration, the load of the calculation relating to the setting of the target second EGR gas amount in the case that the target second EGR gas amount is set by increasing the reference second EGR gas amount which can accomplish the target EGR ratio. For the reason, compared with the first and third embodiments, the fourth embodiment has an advantage that the target second EGR gas amount can be set by a small load of the calculation.

Of course, in the opposite view point, the first and third embodiments have a following advantage, compared with the fourth embodiment. That is, when the maximum flame temperature is higher than the allowable upper limit flame temperature, the maximum flame temperature largely relates to the NOx production amount and the concentration of the oxygen in the gas introduced into the combustion chambers largely relates to the maximum flame temperature. Then, in the first and third embodiments, when the maximum flame temperature is higher than the allowable upper limit flame temperature, the concentration of the oxygen in the gas introduced into the combustion chamber is used as a parameter to be directly controlled, and therefore the maximum flame temperature is quickly and surely controlled to a temperature lower than or equal to the allowable upper limit flame temperature. For the reason, compared with the fourth embodiment, the first and third embodiments have an advantage that the NOx production amount can be quickly and surely restricted within an allowable range.

Further, the fourth embodiment has a following advantage, compared with the first and second embodiments. That is, in the fourth embodiment, when the maximum flame temperature is higher than the allowable upper limit flame temperature, the reference first EGR gas amount is calculated on the basis of the reference EGR ratio obtained from the map shown in FIG. 2 and the reference EGR gas ratio obtained from the map shown in FIG. 3 and the reference first EGR gas amount is set as the target first EGR gas amount and then the first EGR gas amount is controlled to the target first EGR gas amount. On the other hand, in the first and second embodiments, when the maximum flame temperature is higher than the allowable upper limit flame temperature, the first EGR gas amount is simply controlled to zero. In this regard, in either embodiment, when the maximum flame temperature changes from a temperature higher than the allowable upper limit flame temperature to a temperature lower than or equal to the allowable upper limit flame temperature, the reference first and second EGR gas amounts are calculated, respectively, on the basis of the reference EGR ratio obtained from the map shown in FIG. 2 and the reference EGR gas ratio obtained from the map shown in FIG. 3 and the reference first and second EGR gas amounts are set as the target first and second EGR gas amount, respectively, and then the first and second EGR gas amounts are controlled to the target first and second EGR gas amounts, respectively. Accordingly, as in the first and second embodiments, if the first EGR gas amount is controlled to zero when the maximum flame temperature is higher than the allowable upper limit flame temperature, it takes a relatively long time to control the first EGR gas amount to the target first EGR gas amount at the time when the maximum flame temperature becomes lower than or equal to the allowable upper limit flame temperature later. However, as in the fourth embodiment, if the first EGR gas amount is controlled to the target first EGR gas amount equal to the reference first EGR gas amount when the maximum flame temperature is higher than the allowable upper limit flame temperature, it takes a relatively short time to control the first EGR gas amount to the target first EGR gas amount at the time when the maximum flame temperature becomes lower than or equal to the allowable upper limit flame temperature later. As explained above, compared with the first and second embodiments, the fourth embodiment has an advantage that the first EGR gas amount can be quickly and surely controlled to the target first EGR gas amount at the time when the maximum flame temperature changes from a temperature higher than the allowable upper limit flame temperature to a temperature lower than or equal to the allowable upper limit flame temperature.

Of course, in the opposite view point, the first and second embodiments have a following advantage, compared with the fourth embodiment. That is, in the first and second embodiments, when the maximum flame temperature is higher than the allowable upper limit flame temperature, the first EGR gas amount is controlled to zero. On the other hand, in the fourth embodiment, when the maximum flame temperature is higher than the allowable upper limit flame temperature, the first EGR gas amount is controlled to the target first EGR gas amount equal to the reference first EGR gas amount calculated on the basis of the reference EGR ratio and the reference EGR gas ratio. In this regard, compared with the case that the first EGR gas amount is controlled to the target first EGR gas amount, the second EGR gas amount is relatively large in the case that the first EGR gas amount is controlled to zero. As explained above, compared with the first EGR gas, the second EGR gas early reaches the combustion chamber. Further, in the case that the second EGR gas amount is relatively large, the second EGR gas largely influences the maximum flame temperature when the second EGR gas amount is changed. Accordingly, compared with the case that the first EGR gas amount is controlled to zero as in the fourth embodiment, the second EGR gas largely influences the maximum flame temperature when the second EGR gas amount is changed in the case that the first EGR gas amount is controlled to the target first EGR gas amount as in the first and second embodiments. For the reason, compared with the fourth embodiment, the first and second embodiments have an advantage that the maximum flame temperature can be quickly and surely decreased when the maximum flame temperature is higher than the allowable upper limit flame temperature.

It should be noted that in the fourth embodiment, the target second EGR gas amount may be set to an EGR gas amount larger than the reference second EGR gas amount by a constant value, independently of the difference between the maximum flame temperature and the allowable upper limit flame temperature, i.e. the flame temperature difference or the target second EGR gas amount may be set to an EGR gas amount larger than the reference second EGR gas amount, depending on the flame temperature difference. For example, in the case that the target second EGR gas amount is set to an EGR gas amount larger than the reference second EGR gas amount, depending on the flame temperature difference, the target second EGR gas amount may be set to an EGR gas amount which progressively increases as the flame temperature difference becomes large or the target second EGR gas amount is set to an EGR gas amount which continuously increases as the flame temperature difference becomes large. In this case, the concentration of the oxygen in the gas introduced into the combustion chamber is decreased as the maximum flame temperature becomes high relative to the allowable upper limit flame temperature, and therefore an advantage that the maximum flame temperature can be quickly decreased to a temperature lower than or equal to the allowable upper limit flame temperature, can be obtained.

Figure 8:
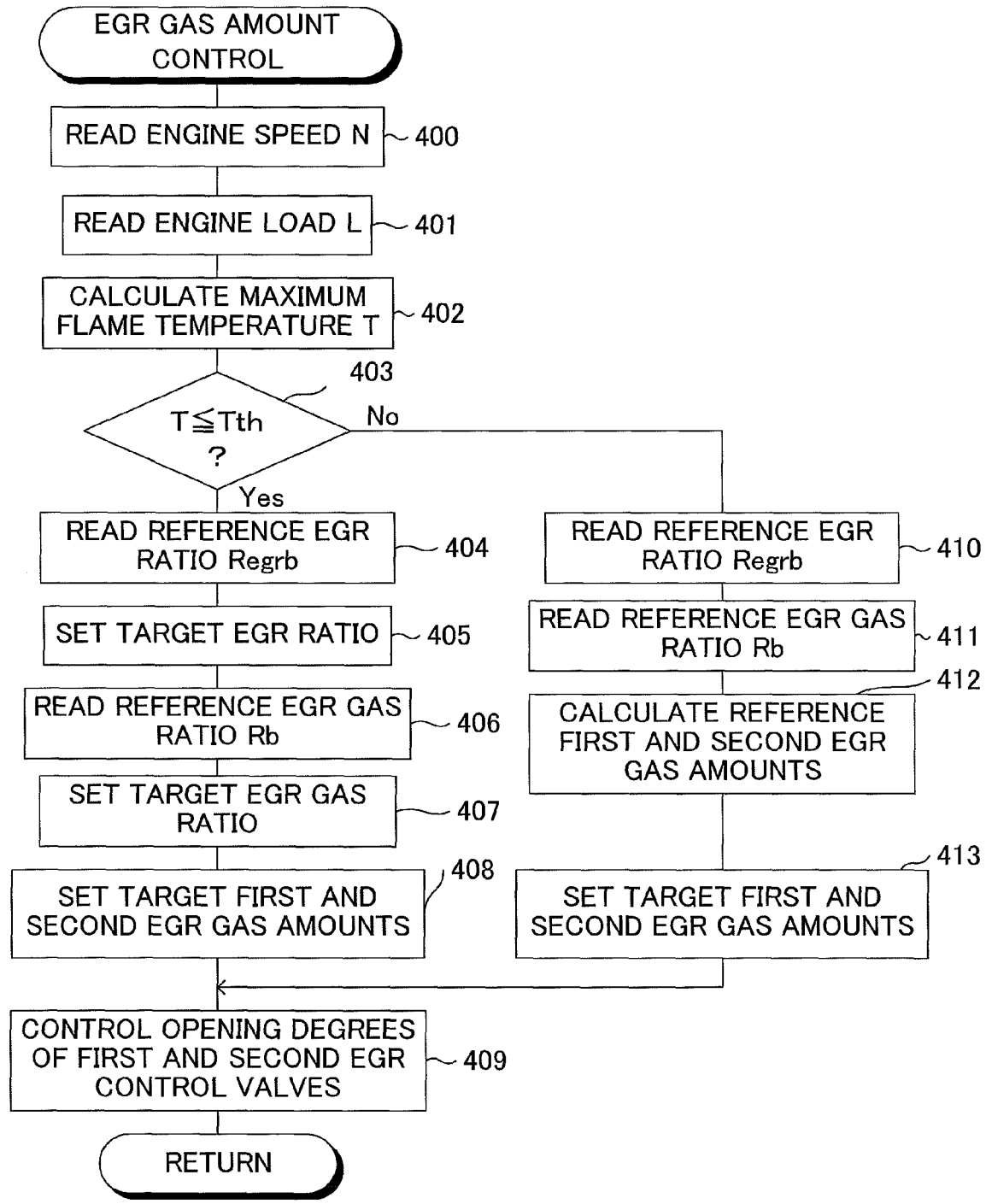
FIG. 8 is a view showing an example of a flow chart for performing a control of EGR gas amounts according to a fourth embodiment.

Next, an example of a flow chart for performing a control of the EGR gas amounts according to the fourth embodiment will be explained. For the control of the EGR gas amounts according to the fourth embodiment, a flow chart shown in FIG. 8 is used. The routine of FIG. 8 is performed every a predetermined timing comes. It should be noted that the steps 400-408 of the flow chart shown in FIG. 8 are the same as the steps 100-108 of the flow chart shown in FIG. 5, and therefore the explanations thereof will be omitted.

In the routine of FIG. 8, when at step 403, it is judged that T>Tth, that is, it is judged that the maximum flame temperature T is higher than the allowable upper limit flame temperature Tth and the routine proceeds to step 410, a reference EGR ratio Regrb is read from the map shown in FIG. 2, depending on the engine speed N and the engine load L. Next, at step 411, a reference EGR gas ratio is read from the map shown in FIG. 3, depending on the engine speed N and the engine load L. Next, at step 412, the first and second EGR gas amounts which can accomplish the reference EGR ratio Regrb read at step 410 and the reference EGR gas ratio Rb read at step 411, are calculated as reference first and second EGR gas amounts, respectively. Next, at step 413, the reference first EGR gas amount calculated at step 412 is set as the target first EGR gas amount and an EGR gas amount larger than the reference second EGR gas amount calculated at step 412 by a constant value is set as the target second EGR gas amount. Next, at step 409, the opening degrees of the first and second control valves 51 and 56 are controlled, respectively, such that the target first and second EGR gas amounts set at step 413 are accomplished and then the routine is terminated.

It should be noted that in the above-explained embodiments, when the maximum flame temperature is higher than the allowable upper limit flame temperature, the target first and second EGR gas amounts are set, separately, however, as a result, it can be said that the EGR gas ratio to be a reference ratio when the maximum flame temperature is lower than or equal to the allowable upper limit flame temperature, is changed. That is, it can be said that when the maximum flame temperature is higher than the allowable upper limit flame temperature, an EGR gas ratio smaller than the EGR gas ratio to be a reference ratio when the maximum flame temperature is lower than or equal to the allowable upper limit flame temperature, is set as the target EGR gas ratio. Accordingly, it can be broadly expressed that in the above-explained embodiments, when the maximum flame temperature is higher than the allowable upper limit flame temperature, an EGR gas ratio smaller than the EGR gas ratio to be a reference ratio when the maximum flame temperature is lower than or equal to the allowable upper limit flame temperature, is set as the target EGR gas ratio, the first and second EGR gas amounts which can accomplish the target EGR gas ratio, are calculated as reference first and second EGR gas amounts, respectively, and the reference first and second EGR gas amounts are set as target first and second EGR gas amounts, respectively.

An embodiment will be explained wherein as explained above, when the maximum flame temperature is higher than the allowable upper limit flame temperature, the maximum flame temperature is decreased by changing the EGR gas ratio to be a reference ratio when the maximum flame temperature is lower than or equal to the allowable upper limit flame temperature.

In this embodiment (hereinafter, referred to as "fifth embodiment"), when the maximum flame temperature is higher than the allowable upper limit flame temperature, a reference EGR ratio Regrb is read from the map shown in FIG. 2, depending on the engine speed N and the engine load L and a reference EGR gas ratio is read from the map shown in FIG. 3, depending on the engine speed N and the engine load L. Then, the reference EGR ratio is set as the target EGR ratio and the reference EGR gas ratio is decreased and then the decreased reference EGR gas ratio is set as the target EGR gas ratio. Then, the first and second EGR gas amounts which can accomplish the target EGR ratio and the target EGR gas ratio, are calculated as reference first and second EGR gas amounts, respectively, and the reference first and second EGR gas amounts are set as target first and second EGR gas amounts, respectively. Then, the opening degrees of the first and second EGR control valves 51 and 56 are controlled, respectively, such that the target first EGR gas amount of the first EGR gas is introduced into the intake passage 30 and the target second EGR gas amount of the second EGR gas is introduced into the intake passage 30.

It should be noted that in the fifth embodiment, when the maximum flame temperature is higher than the allowable upper limit flame temperature, the reference EGR gas ratio is set to zero. In this case, the target first EGR gas amount is set to zero.

Figure 9:
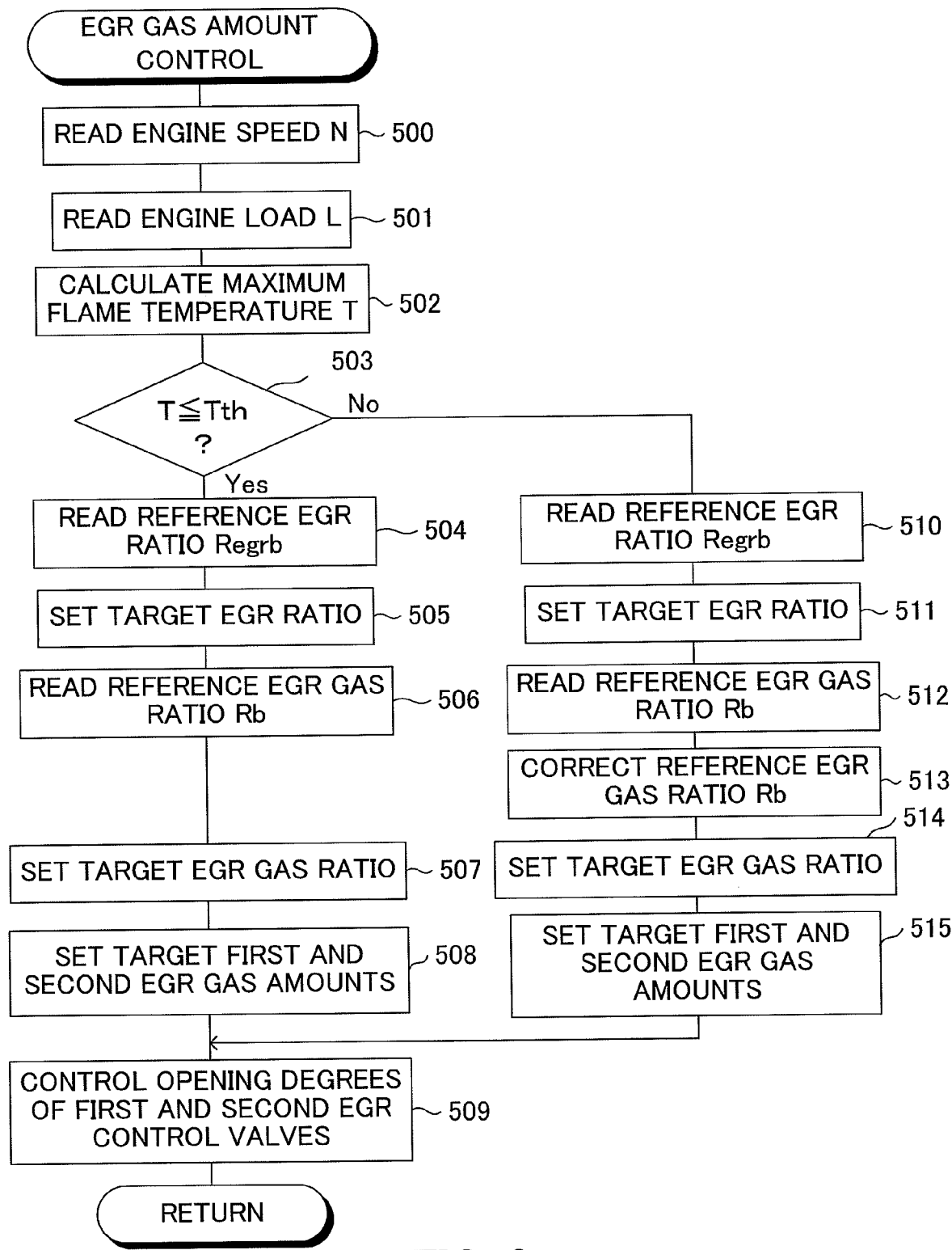
FIG. 9 is a view showing an example of a flow chart for performing a control of EGR gas amounts according to a fifth embodiment.

Next, an example of a flow chart for performing a control of the EGR gas amounts according to the fifth embodiment will be explained. For the control of the EGR gas amounts according to the fifth embodiment, a flow chart shown in FIG. 9 is used. The routine of FIG. 9 is performed every a predetermined timing comes. It should be noted that the steps 500-508 of the flow chart shown in FIG. 9 are the same as the steps 100-108 of the flow chart shown in FIG. 5, and therefore the explanations thereof will be omitted.

In the routine of FIG. 9, when at step 503, it is judged that T>Tth, that is, it is judged that the maximum flame temperature T is higher than the allowable upper limit flame temperature Tth and the routine proceeds to step 510, a reference EGR ratio Regrb is read from the map shown in FIG. 2, depending on the engine speed N and the engine load L. Next, at step 511, the reference EGR ratio Regrb read at step 510 is set as the target EGR ratio. Next, at step 512, a reference EGR gas ratio Rb is read from the map shown in FIG. 3, depending on the engine speed N and the engine load L. Next, the reference EGR gas ratio Rb read at step 512 is corrected such that it is decreased. Next, at step 514, the reference EGR gas ratio Rb corrected at step 513 is set as the target EGR gas ratio. Next, at step 515, the first and second EGR gas amounts which can accomplish the target EGR ratio set at step 511 and the target EGR gas ratio set at step 514, are set as the target first and second EGR gas amounts, respectively. Next, at step 509, the opening degrees of the first and second EGR control valves 51 and 56 are controlled, respectively, such that the target first and second EGR gas amounts set at step 515 are accomplished and then the routine is terminated.

It should be noted that in the above-explained embodiments, the EGR gas ratio is a ratio of the first EGR gas amount relative to the sum of the first and second EGR gas amounts, however, the EGR gas ratio may be a ratio of the second EGR gas amount relative to the sum of the first and second EGR gas amounts or a ratio of the second EGR gas amount relative to the first EGR gas amount or a ratio of the first EGR gas amount relative to the second EGR gas amount. Of course, in these cases, when the maximum flame temperature is higher than the allowable upper limit flame temperature, the EGR gas ratio is changed such that the second EGR gas amount of the second EGR gas larger than the target second EGR gas amount set when the maximum flame temperature is lower than or equal to the allowable upper limit flame temperature, is introduced into the intake passage.

Further, in the above-explained embodiments, the maximum flame temperature is used as a parameter for determining if the reference second EGR gas amount is set as the target second EGR gas amount when the target second EGR gas amount is set. However, in the case that the parameter largely relating to the NOx production amount is the flame temperature rather than the maximum flame temperature or in the case that it can be judged that it is sufficient to use the flame temperature rather than the maximum flame temperature as a parameter largely relating to the NOx production amount, the flame temperature may be used as a parameter for determining if the reference second EGR gas amount is set as the target second EGR gas amount when the target second EGR gas amount is set.

Further, the above-explained embodiments are exhaust gas recirculation devices wherein the invention applies to the compression ignition engine. However, the invention can apply to a spark ignition engine wherein the fuel in the combustion chamber is burned by a spark from an ignition plug.

The invention claimed is:

1. An exhaust gas recirculation device of an engine, comprising:

a first exhaust gas recirculation passage for connecting an exhaust passage and an intake passage to each other and introducing into said intake passage an exhaust gas discharged from a combustion chamber to said exhaust passage;

a second exhaust gas recirculation passage for connecting a part of said exhaust passage upstream of a part of said exhaust passage connected to said first exhaust gas recirculation passage and a part of said intake passage downstream of a part of said intake passage connected to said first exhaust gas recirculation passage to each other and introducing into said intake passage the exhaust gas discharged from said combustion chamber to said exhaust passage;

control means for controlling the amount of the exhaust gas introduced into said intake passage via said first exhaust gas recirculation passage to a predetermined first target exhaust gas recirculation amount and controlling the amount of the exhaust gas introduced into said intake passage via said second exhaust gas recirculation passage to a predetermined second target exhaust gas recirculation amount; and setting means for setting said first and second target exhaust gas recirculation amounts, wherein said setting means sets a first reference exhaust gas recirculation amount set depending on an operation condition of said engine as said first target exhaust gas recirculation amount and a second reference exhaust gas recirculation amount set depending on the operation condition of said engine as said second target exhaust gas recirculation amount when the temperature of the flame on the combustion of a fuel in said combustion chamber is lower than or equal to a predetermined allowable upper limit flame temperature, and wherein said setting means sets one of said first reference exhaust gas recirculation amount and an amount smaller than said first reference exhaust gas recirculation amount as said first target exhaust gas recirculation amount and setting an amount larger than said second reference exhaust gas recirculation amount as said second target exhaust gas recirculation amount when the temperature of the flame on the combustion of the fuel in said combustion chamber is higher than said allowable upper limit flame temperature.

2. The exhaust gas recirculation device of the engine as set forth in claim 1, wherein said setting means sets an amount which can make the concentration of the oxygen in a gas introduced into said combustion chamber an oxygen concentration which can decrease the temperature of the flame as said second target exhaust gas recirculation amount when the temperature of the flame on the combustion of the fuel in said combustion chamber is higher than said allowable upper limit flame temperature.

3. The exhaust gas recirculation device of the engine as set forth in claim 2, wherein said setting means sets an amount which increases as the difference between the temperature of the flame on the combustion of the fuel in said combustion chamber and said allowable upper limit flame temperature becomes large as said second target exhaust gas recirculation amount when the temperature of the flame on the combustion of the fuel in said combustion chamber is higher than said allowable upper limit flame temperature.

4. The exhaust gas recirculation device of the engine as set forth in claim 3, wherein said setting means sets zero as said first target exhaust gas recirculation amount when the temperature of the flame on the combustion of the fuel in said combustion chamber is higher than said allowable upper limit flame temperature.

5. The exhaust gas recirculation device of the engine as set forth in claim 1, wherein said setting means sets an amount which increases as the difference between the temperature of the flame on the combustion of the fuel in said combustion chamber and said allowable upper limit flame temperature becomes large as said second target exhaust gas recirculation amount when the temperature of the flame on the combustion of the fuel in said combustion chamber is higher than said allowable upper limit flame temperature.

6. The exhaust gas recirculation device of the engine as set forth in claim 5, wherein said setting means sets zero as said first target exhaust gas recirculation amount when the temperature of the flame on the combustion of the fuel in said combustion chamber is higher than said allowable upper limit flame temperature.

7. The exhaust gas recirculation device of the engine as set forth in claim 1, wherein said setting means sets zero as said first target exhaust gas recirculation amount when the temperature of the flame on the combustion of the fuel in said combustion chamber is higher than said allowable upper limit flame temperature.

8. An exhaust gas recirculation device of an engine, comprising:
a first exhaust gas recirculation passage for connecting an exhaust passage and an intake passage to each other and introducing into said intake passage an exhaust gas discharged from a combustion chamber to said exhaust passage;
a second exhaust gas recirculation passage for connecting said exhaust passage upstream of a part of said exhaust passage connected to said first exhaust gas recirculation passage and said intake passage downstream of a part of said intake passage connected to said first exhaust gas recirculation passage to each other and introducing into said intake passage the exhaust gas discharged from said combustion chamber to said exhaust passage;
control means for controlling a ratio between the amount of the exhaust gas introduced into said intake passage via said first exhaust gas recirculation passage and the amount of the exhaust gas introduced into said intake passage via said second gas recirculation passage to a predetermined target exhaust gas recirculation ratio; and
setting means for setting said target exhaust gas recirculation ratio,
wherein said setting means sets a reference exhaust gas recirculation ratio set depending on an operation condition of said engine as said target exhaust gas recirculation ratio when a temperature of the flame on the combustion of a fuel in said combustion chamber is lower than or equal to a predetermined allowable upper limit flame temperature; and
wherein said setting means sets said reference exhaust gas recirculation ratio corrected such that the amount of the exhaust gas introduced into said intake passage via said second exhaust gas recirculation passage becomes larger than an amount which can accomplish said reference exhaust gas recirculation ratio as said target exhaust gas recirculation ratio when the temperature of the flame on the combustion of the fuel in said combustion chamber is higher than said allowable upper limit flame temperature.

9. The exhaust gas recirculation device of the engine as set forth in claim 8, wherein said setting means sets said reference exhaust gas recirculation ratio corrected such that the amount of the exhaust gas introduced into said intake passage via said second exhaust gas recirculation passage becomes large as the difference between the temperature of the flame on the combustion of the fuel in said combustion chamber and said allowable upper limit flame temperature becomes large as said target exhaust gas recirculation ratio when the temperature of the flame on the combustion of the fuel in said combustion chamber is higher than said allowable upper limit flame temperature.

10. The exhaust gas recirculation device of the engine as set forth in claim 9, wherein said setting means sets said reference exhaust gas recirculation ratio corrected such that the amount of the exhaust gas introduced into said intake passage via said first exhaust gas recirculation passage is zero as said target exhaust gas recirculation ratio when the temperature of the flame on the combustion of the fuel in said combustion chamber is higher than said allowable upper limit flame temperature.

11. The exhaust gas recirculation device of the engine as set forth in claim 8, wherein said setting means sets said reference exhaust gas recirculation ratio corrected such that the amount of the exhaust gas introduced into said intake passage via said first exhaust gas recirculation passage is zero, is set as said target exhaust gas recirculation ratio when the temperature of the flame on the combustion of the fuel in said combustion chamber is higher than said allowable upper limit flame temperature.

* * * * *